(12) United States Patent
Masui

(10) Patent No.: US 9,116,331 B2
(45) Date of Patent: Aug. 25, 2015

(54) PROJECTION LENS SYSTEM HAVING VARIABLE MAGNIFICATION

(71) Applicant: Atsuo Masui, Sakai (JP)

(72) Inventor: Atsuo Masui, Sakai (JP)

(73) Assignee: KONICA MINOLTA ADVANCED LAYERS, INC., Tokyo (JP)

( * ) Notice: Subject to any disclaimer, the term of this patent is extended or adjusted under 35 U.S.C. 154(b) by 423 days.

(21) Appl. No.: 13/748,369

(22) Filed: Jan. 23, 2013

(65) Prior Publication Data

US 2013/0188155 A1 Jul. 25, 2013

(30) Foreign Application Priority Data

Jan. 23, 2012 (JP) .................. 2012-010920

(51) Int. Cl.
| | |
|---|---|
| G03B 21/14 | (2006.01) |
| G02B 15/14 | (2006.01) |
| G03B 21/20 | (2006.01) |
| G02B 13/16 | (2006.01) |
| G02B 13/22 | (2006.01) |
| G02B 15/17 | (2006.01) |

(52) U.S. Cl.
CPC ............. *G02B 15/14* (2013.01); *G02B 13/16* (2013.01); *G02B 13/22* (2013.01); *G02B 15/17* (2013.01); *G03B 21/2033* (2013.01)

(58) Field of Classification Search
CPC ........ G02B 13/16; G02B 13/22; G02B 13/04; G02B 15/173

USPC ............ 353/30, 31, 37, 38, 94, 97, 101, 102; 359/649, 680–682, 683, 686, 687, 690, 359/694, 696, 814; 348/743–747; 349/5, 349/7–9
See application file for complete search history.

(56) References Cited

U.S. PATENT DOCUMENTS

| | | | | |
|---|---|---|---|---|
| 8,038,303 | B2 * | 10/2011 | Inoue | ............................. 353/70 |
| 2002/0018301 | A1 * | 2/2002 | Narimatsu et al. | ............. 359/683 |
| 2006/0285079 | A1 * | 12/2006 | Wada | ............................. 353/46 |
| 2009/0323197 | A1 | 12/2009 | Masui | |
| 2012/0268831 | A1 * | 10/2012 | Yamanashi | .................. 359/686 |

FOREIGN PATENT DOCUMENTS

| | | |
|---|---|---|
| JP | 10-161026 | 6/1998 |
| JP | 2010-8797 | 1/2010 |

* cited by examiner

*Primary Examiner* — Sultan Chowdhury
(74) *Attorney, Agent, or Firm* — Cozen O'Connor

(57) ABSTRACT

A projection lens system is constructed as a zoom lens system which is for use with a laser light source and performs magnification variation by moving at least a lens group along the optical axis, and the projection lens system fulfills the following conditional formula: $(|AC(B2-G)|+|AC(R2-G)|)/(|AC(B1-G)|+|AC(R1-G)|)<0.8$, where $AC(B2-G)$ represents longitudinal chromatic aberration between the wavelengths $\lambda B2$ and $\lambda G$; $AC(R2-G)$ represents longitudinal chromatic aberration between the wavelengths $\lambda R2$ and $\lambda G$; $AC(B1-G)$ represents longitudinal chromatic aberration between the wavelengths $\lambda B1$ and $\lambda G$; and $AC(R1-G)$ represents longitudinal chromatic aberration between the wavelengths $\lambda R1$ and $\lambda G$.

20 Claims, 18 Drawing Sheets

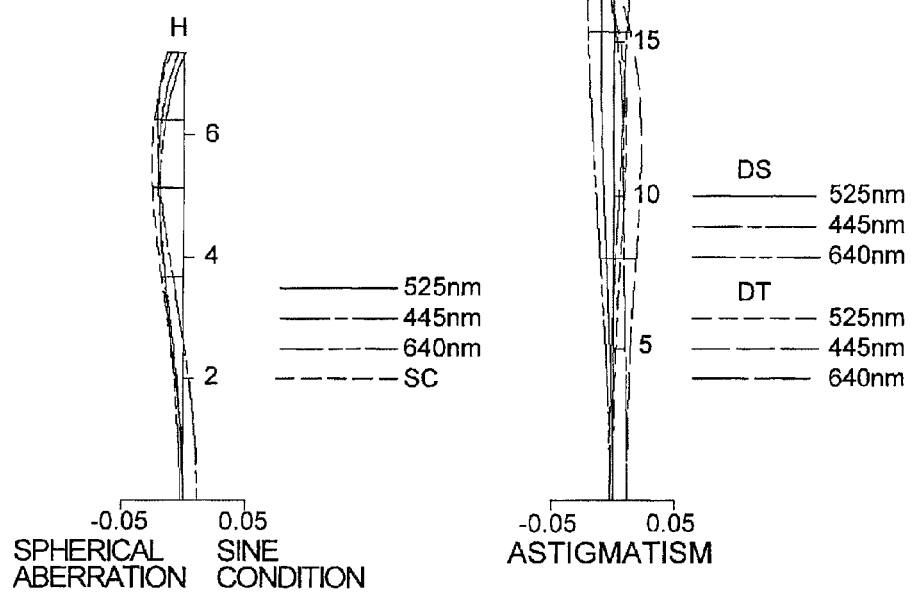
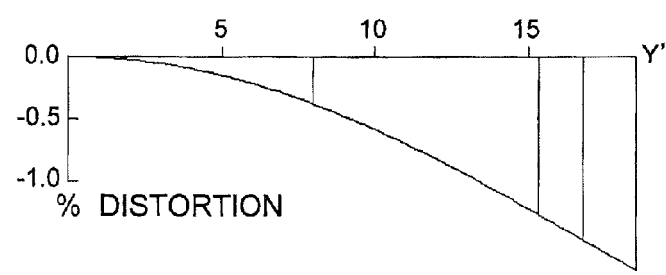
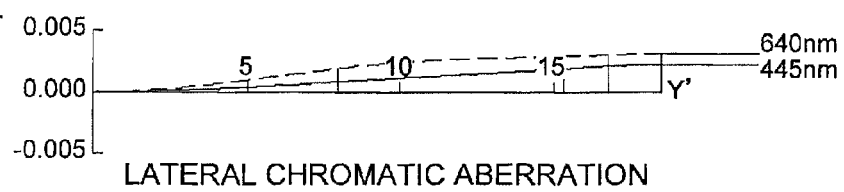

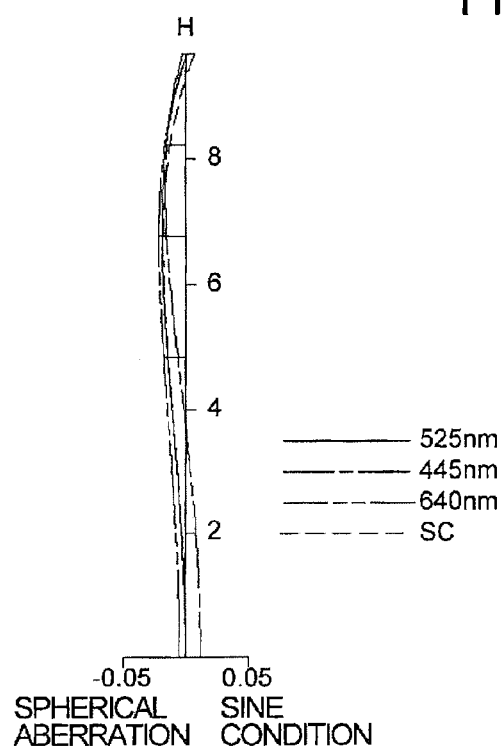
FIG.6A EX1 (M)
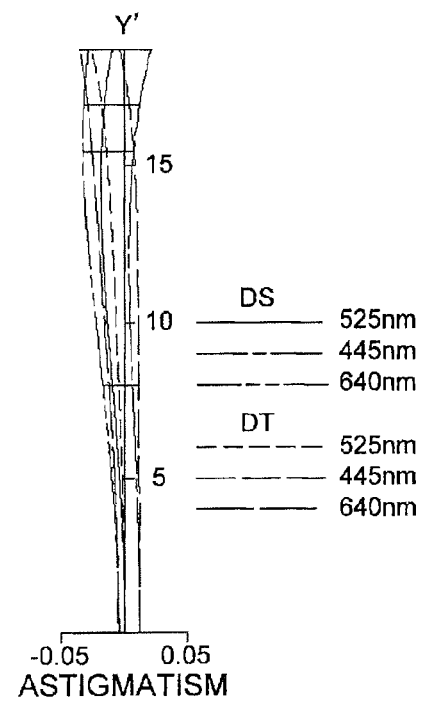
FIG.6B EX1 (M)
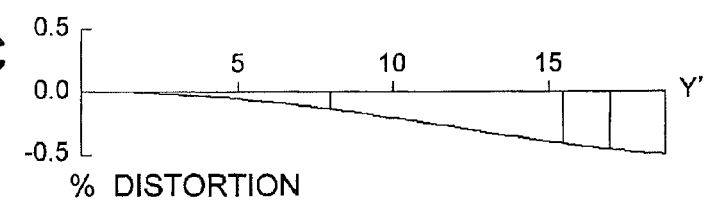
FIG.6C EX1 (M)
% DISTORTION
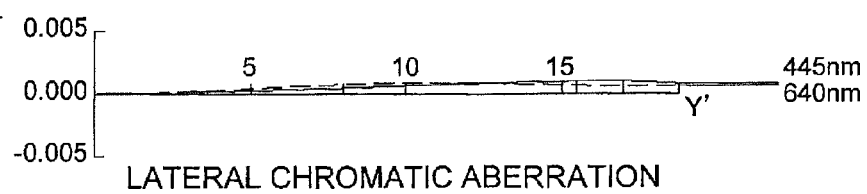
FIG.6D EX1 (M)
LATERAL CHROMATIC ABERRATION FIG.7A EX1 (T)
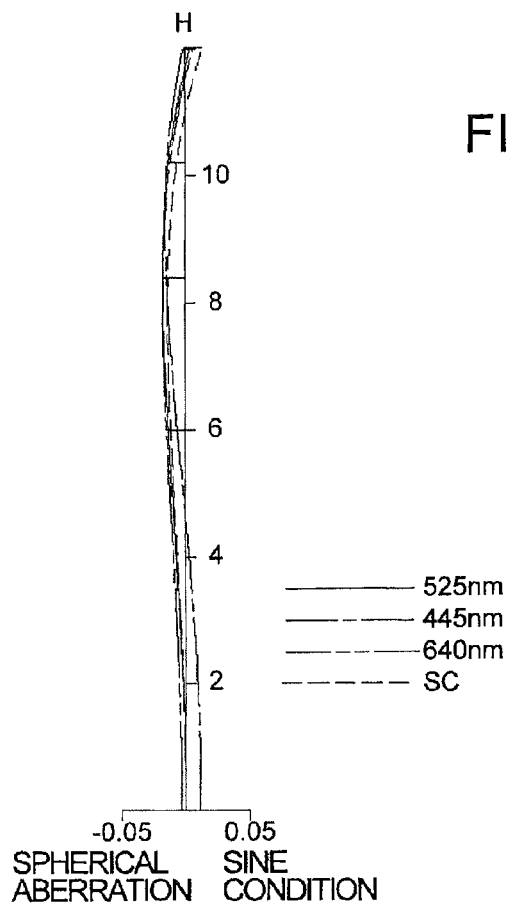
FIG.7B EX1 (T)
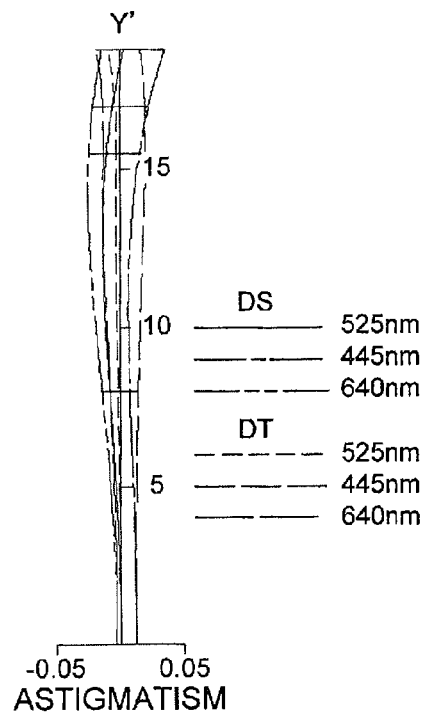
FIG.7C EX1 (T)
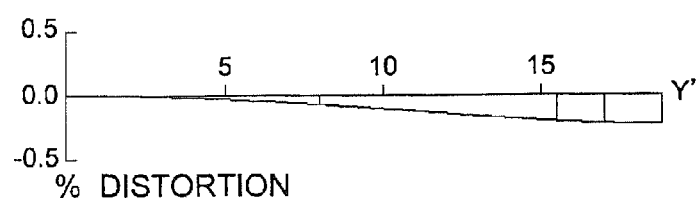
FIG.7D EX1 (T)
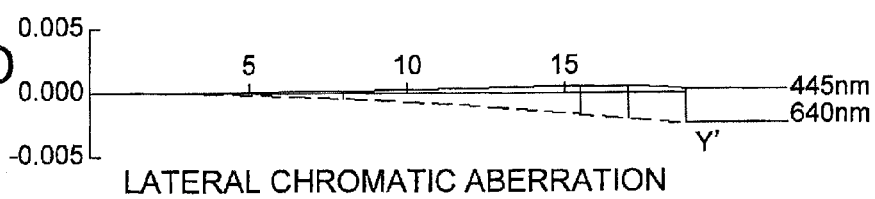

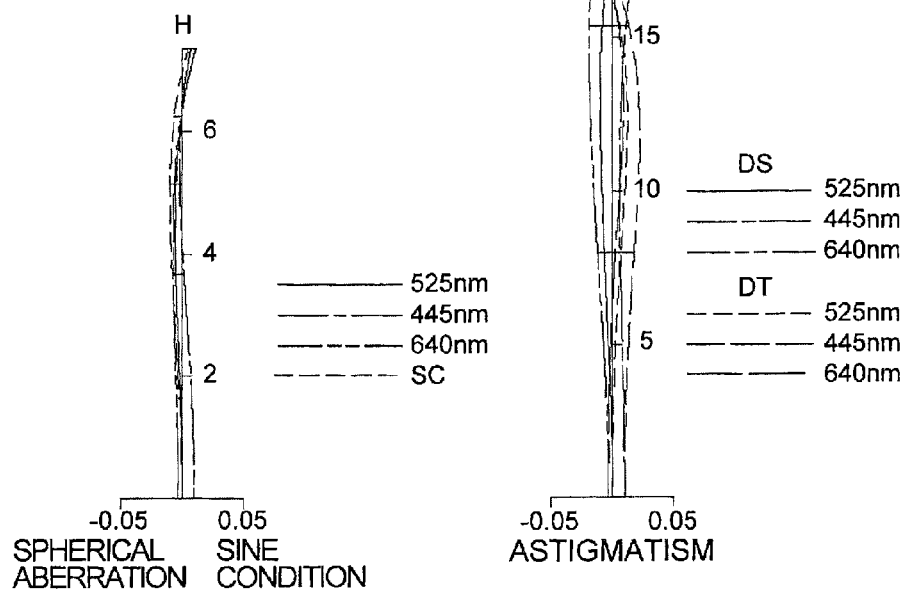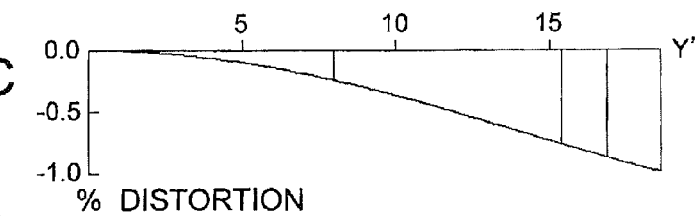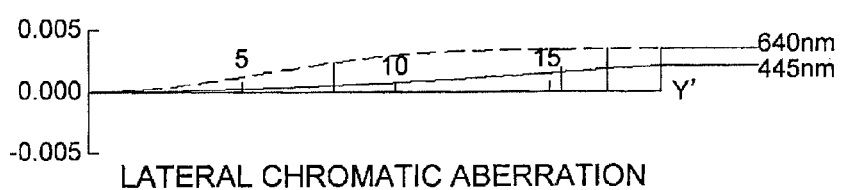

FIG.9A EX2 (M)
FIG.9B EX2 (M)
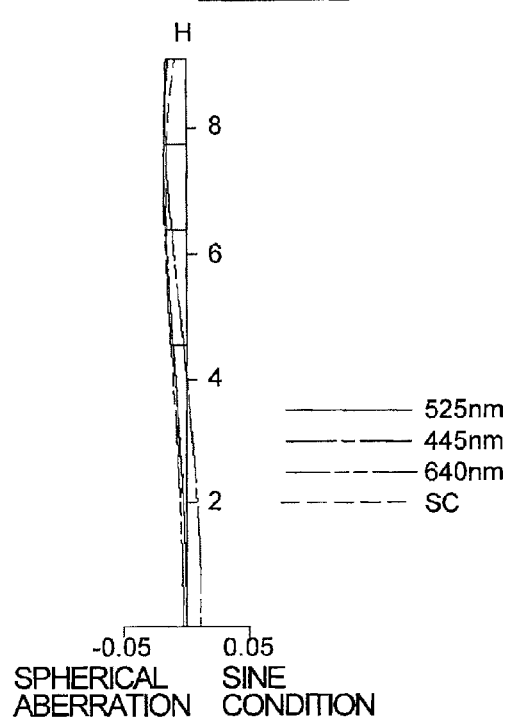
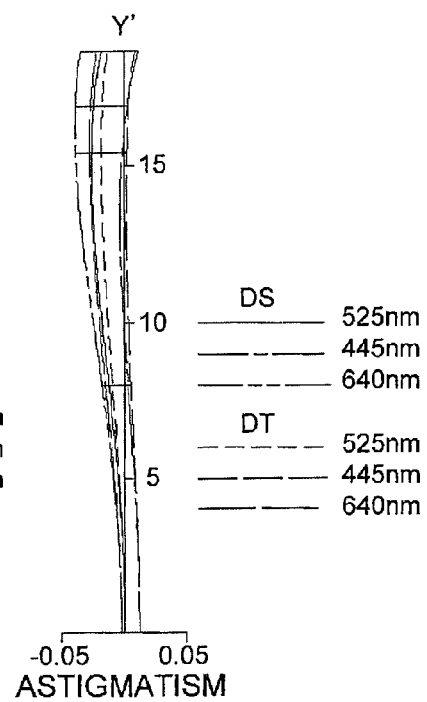
FIG.9C EX2 (M)
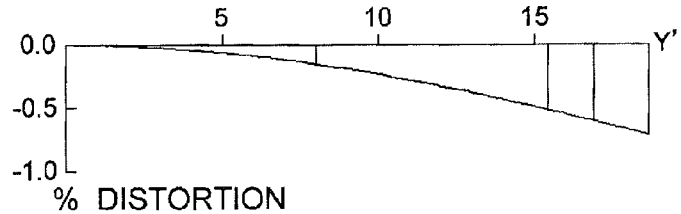
FIG.9D EX2 (M)
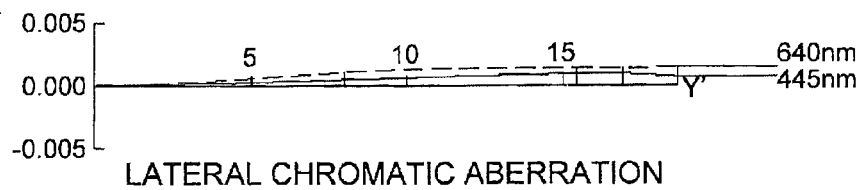

FIG.10A EX2 (T)
FIG.10B EX2 (T)
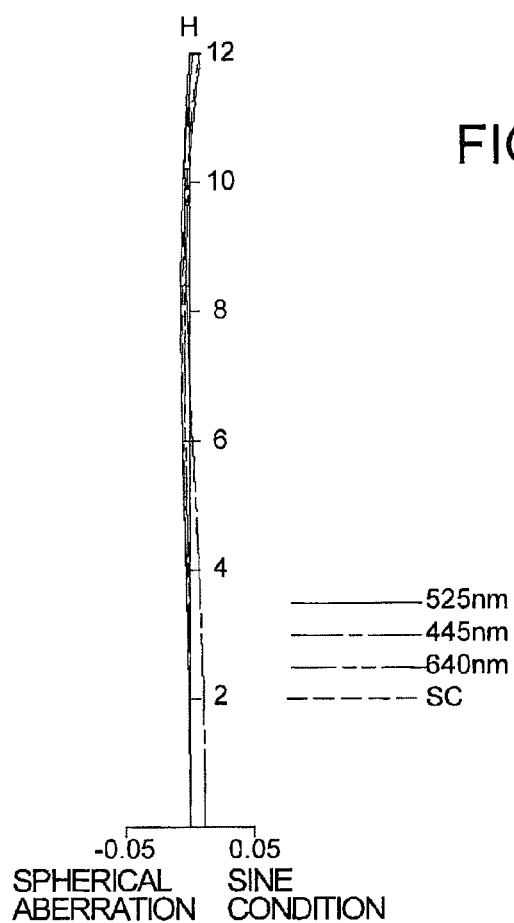
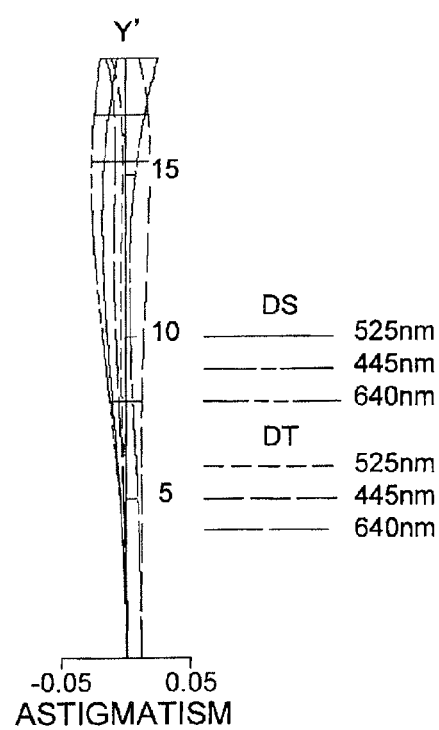
SPHERICAL ABERRATION   SINE CONDITION
ASTIGMATISM
FIG.10C EX2 (T)
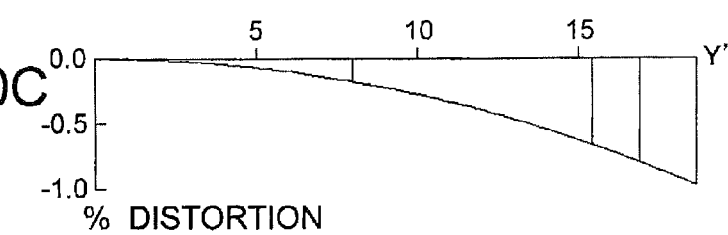
% DISTORTION
FIG.10D EX2 (T)
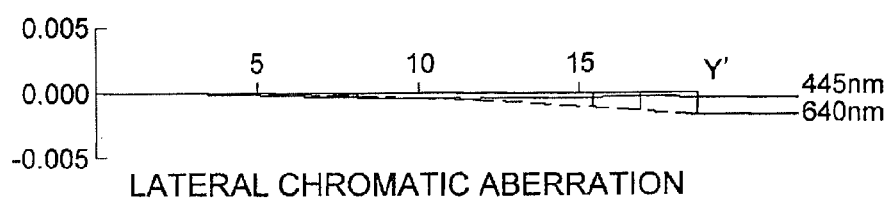
LATERAL CHROMATIC ABERRATION

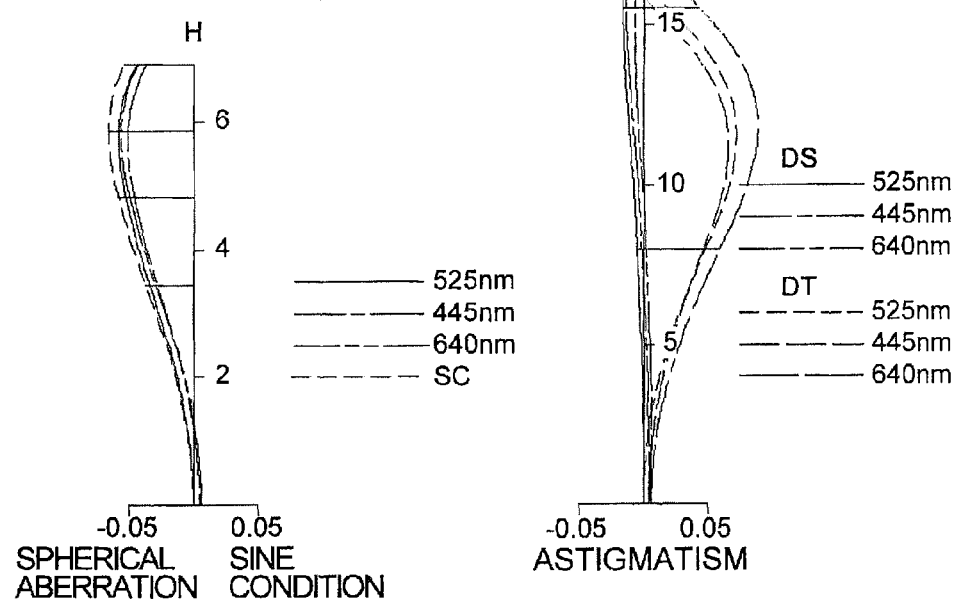
FIG.11A EX3 (W)
FIG.11B EX3 (W)
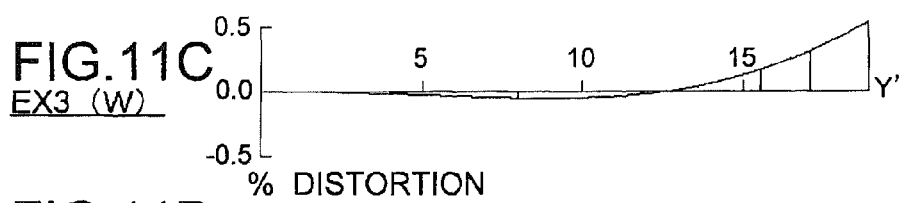
FIG.11C EX3 (W)
% DISTORTION
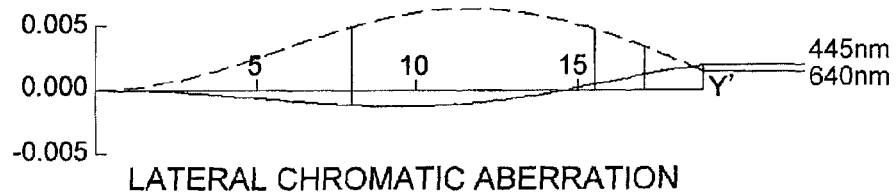
FIG.11D EX3 (W)
LATERAL CHROMATIC ABERRATION

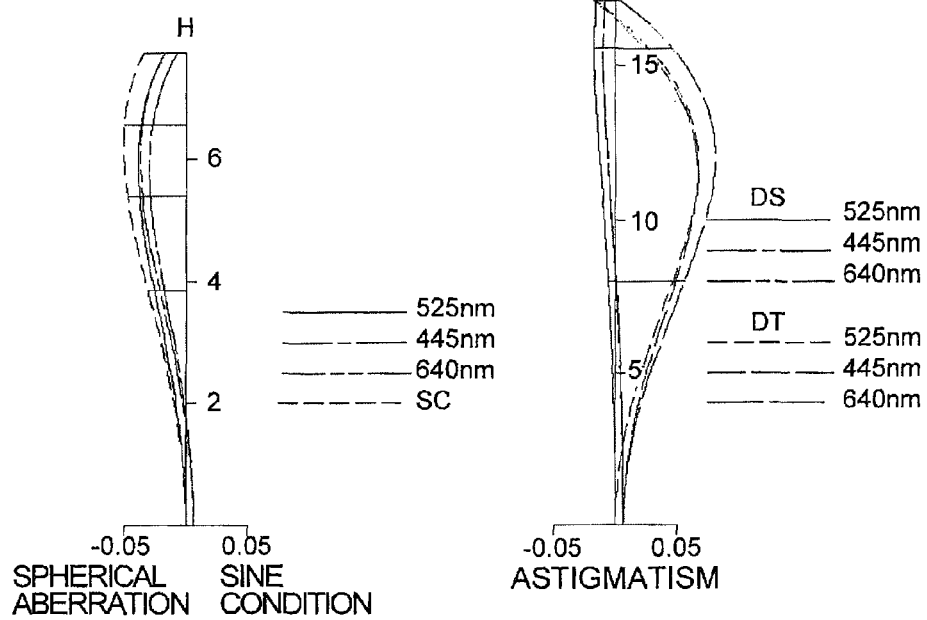
FIG.12A EX3 (M)
FIG.12B EX3 (M)
SPHERICAL ABERRATION / SINE CONDITION
ASTIGMATISM
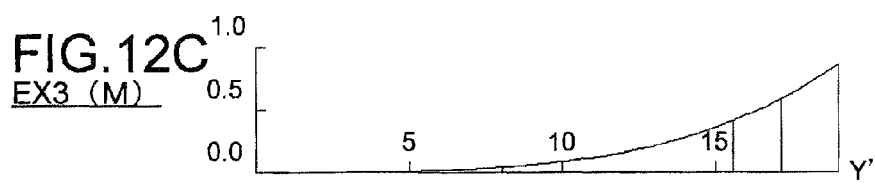
FIG.12C EX3 (M)
% DISTORTION
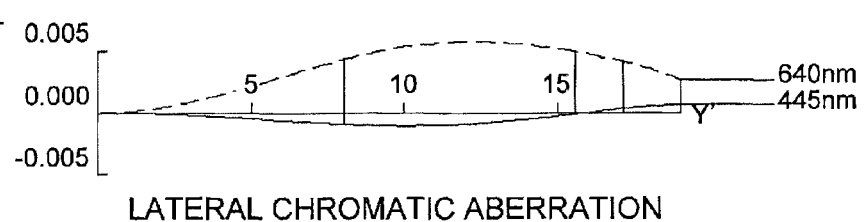
FIG.12D EX3 (M)
LATERAL CHROMATIC ABERRATION

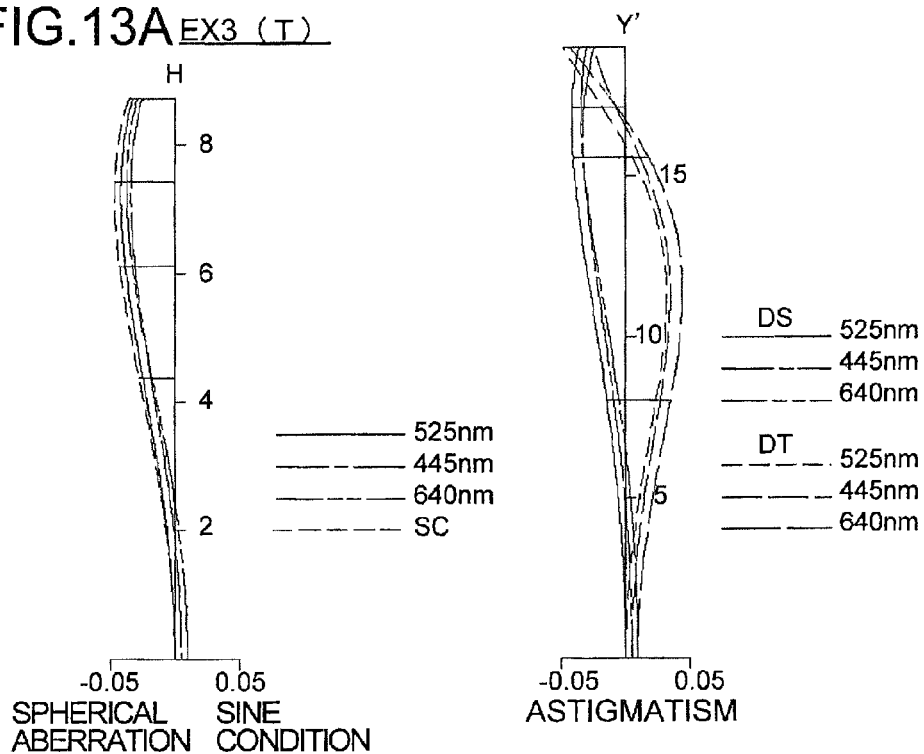
FIG.13A EX3 (T)
FIG.13B EX3 (T)
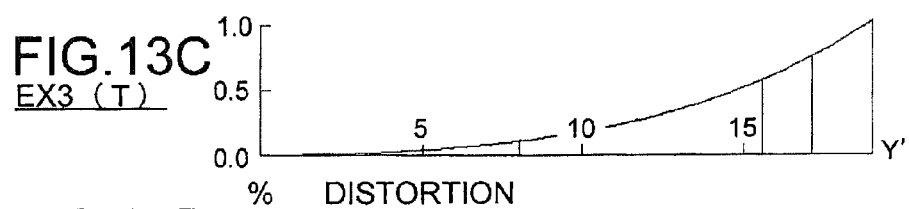
FIG.13C EX3 (T)
% DISTORTION
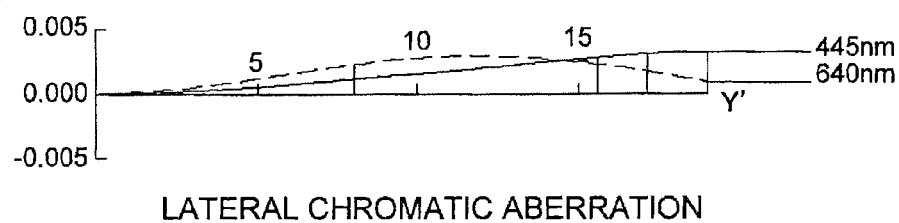
FIG.13D EX3 (T)
LATERAL CHROMATIC ABERRATION

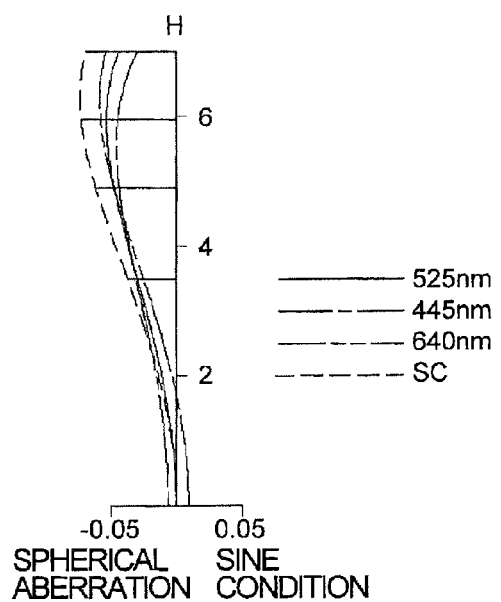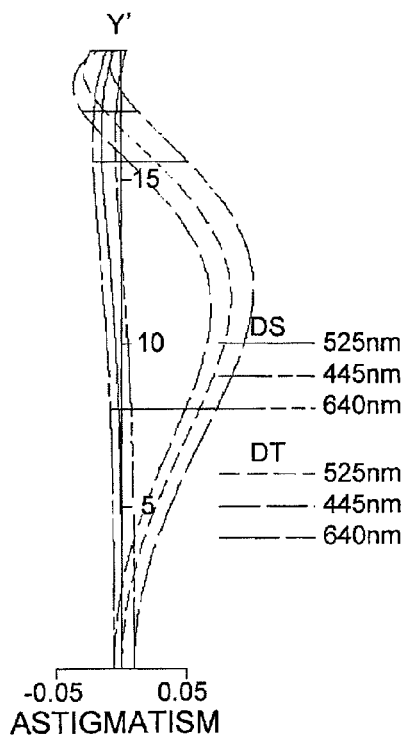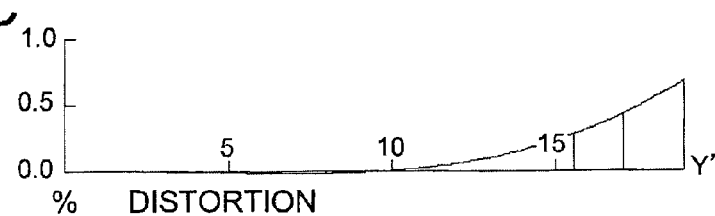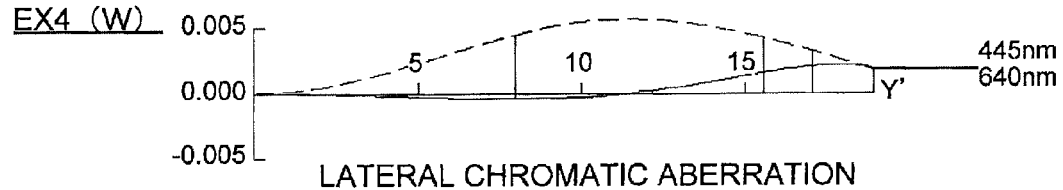

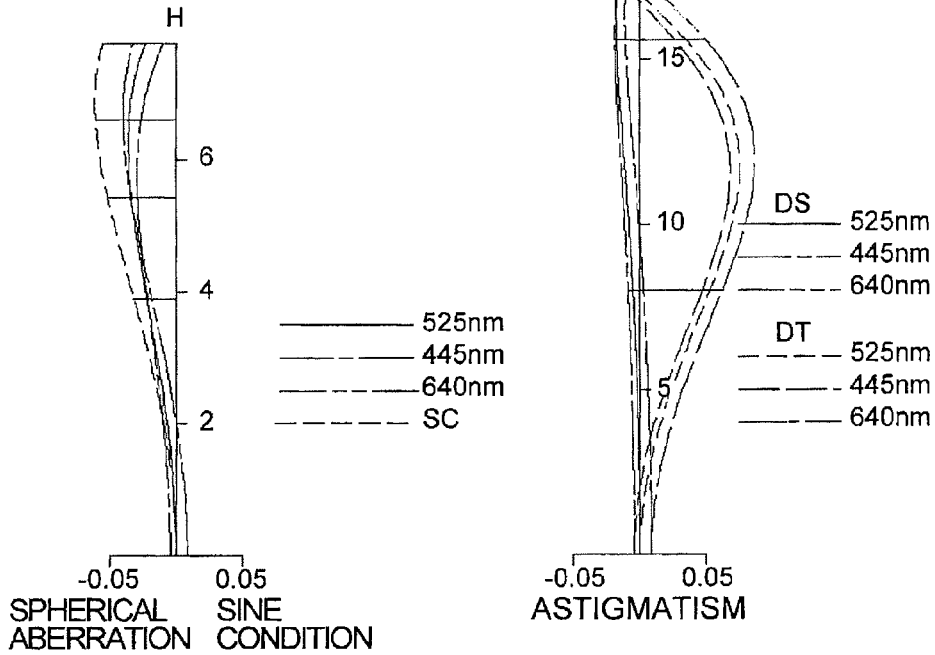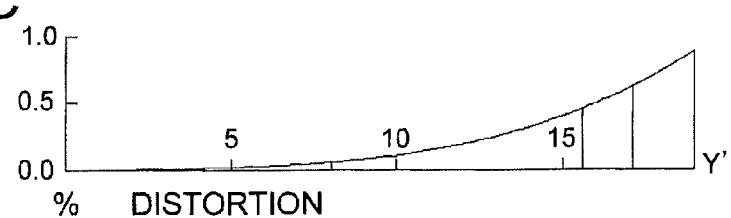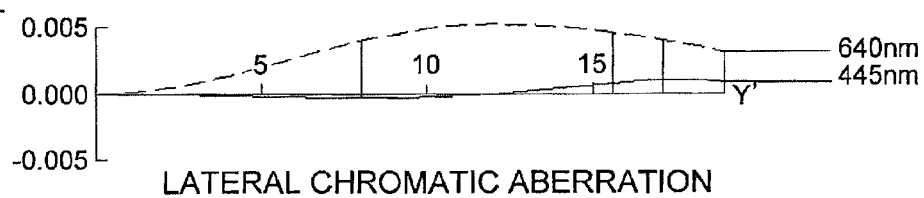

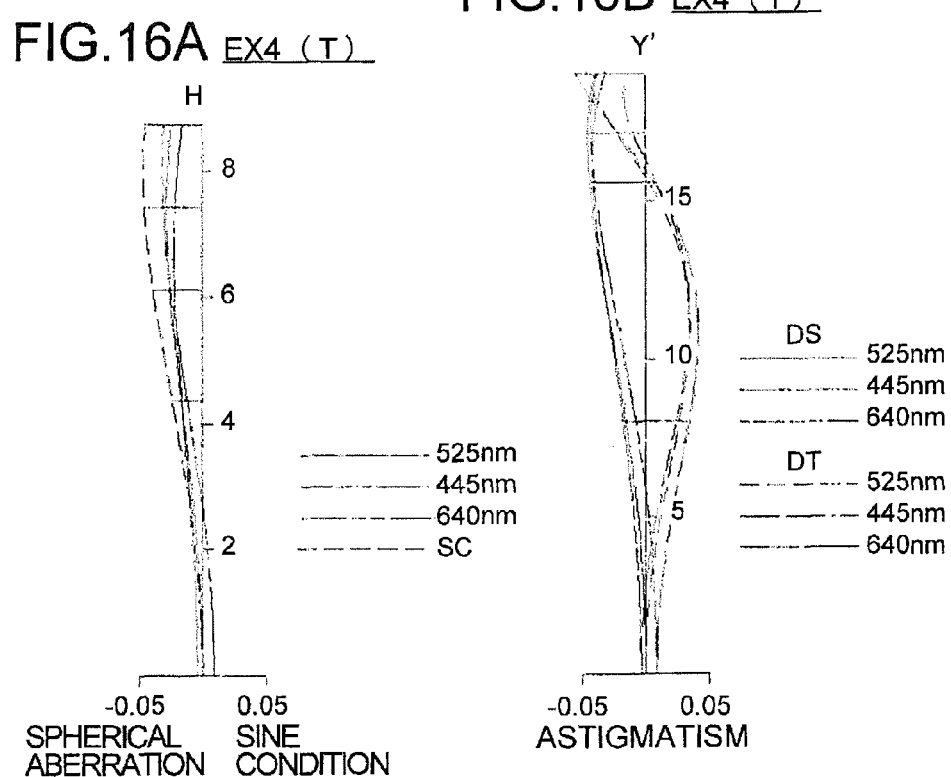

PROJECTION LENS SYSTEM HAVING VARIABLE MAGNIFICATION

This application is based on Japanese Patent Application No. 2012-010920 filed on Jan. 23, 2012, the contents of which are hereby incorporated by reference.

BACKGROUND OF THE INVENTION

1. Field of the Invention

The present invention relates to a projection lens system having a variable magnification function and a projector, and specifically relates, for example, to a projector using a highly monochromatic laser light source and an ideal projection zoom lens system for such a projector.

2. Description of Related Art

Zoom lens systems preferably usable as a projection lens system for projectors are proposed, for example, in Patent Literatures 1 and 2 listed below. Unfortunately, however, those zoom lens systems are designed for use with a white light source such as a xenon lamp, and thus they cannot be said to be suitable for a projector using a laser light source.

Patent Literature 1: JP-A-2010-008797
Patent Literature 2: JP-A-H10-161026

Laser light sources have an advantage that they are able to achieve a wide color reproduction range. To exploit the wide color reproduction range, it is necessary to preferably correct chromatic aberration in a wider wavelength range than conventional projection lens systems. Moreover, improvement has been sought in telecentricity for the purpose of achieving improved efficiency of combining colors by using a dichroic prism or of extracting illumination light by using a TIR (Total Internal Reflection) prism. There have been requests for a compact and low-cost zoom lens system that meets these requirements as a projection lens system.

With a white light source such as a xenon lamp, since light of each color has a somewhat wide wavelength range, even if chromatic aberration varies during zooming, the variation is averaged in the wavelength range, and this makes the chromatic aberration comparatively less noticeable. In contrast, with a single-color light source represented by a laser light source, since only a particular color is used, chromatic aberration is not averaged, and thus is noticeable.

In the zoom lens system described in Patent Literature 1, a third lens group is composed of three lens elements. In a compact projection lens system having this construction, lens groups would move by only a small moving amount in the vicinity of an aperture stop that corrects longitudinal chromatic aberration, and this makes it difficult to correct longitudinal chromatic aberration throughout the entire zoom range. And, if a sufficient moving amount were secured to correct longitudinal chromatic aberration, the size of the lens system would be increased and accordingly the cost would be increased.

In a zoom lens system disclosed in Patent Literature 2, part of movable lens groups from a third lens group onward move by a large moving amount. This increases variation in the passing position of an on-axis marginal light ray caused by zooming, and makes it difficult to reduce variation in longitudinal chromatic aberration caused by zooming.

SUMMARY OF THE INVENTION

The present invention has been devised against the background discussed above, and aims to provide a compact projection lens system capable of achieving sufficiently small longitudinal chromatic aberration throughout the entire zoom range even in the wide color reproduction range of laser light sources while securing telecentricity throughout the entire zoom range, and to provide a projector provided with such a projection lens system.

According to an aspect of the present invention, a projection lens system is constructed as a zoom lens system which is for use with a laser light source and performs magnification variation by moving at least a lens group along an optical axis, the projection lens system fulfilling conditional formula (1) below:

$$(|AC(B2-G)|+|AC(R2-G)|)/(|AC(B1-G)|+|AC(R1-G)|)<0.8 \quad (1)$$

where
$\lambda G$ represents a green laser wavelength;
$\lambda B2$ represents a blue laser wavelength;
$\lambda R2$ represents a red laser wavelength;
$\lambda B1$ represents a middle value of the green laser wavelength $\lambda G$ and the blue laser wavelength $\lambda B2$;
$\lambda R1$ represents a middle value of the green laser wavelength $\lambda G$ and the red laser wavelength $\lambda R2$;
$AC(B2-G)$ represents longitudinal chromatic aberration between the wavelengths $\lambda B2$ and $\lambda G$;
$AC(R2-G)$ represents longitudinal chromatic aberration between the wavelengths $\lambda R2$ and $\lambda G$;
$AC(B1-G)$ represents longitudinal chromatic aberration between the wavelengths $\lambda B1$ and $\lambda G$; and
$AC(R1-G)$ represents longitudinal chromatic aberration between the wavelengths $\lambda R1$ and $\lambda G$.

According to another aspect of the present invention, a projector includes an image display device that displays an image, a laser light source, an illumination optical system that directs light from the laser light source to the image display device; and a projection lens system that projects, while enlarging, the image displayed on the image display device onto a screen surface. Here, the projection lens system is constructed as a zoom lens system which is for use with a laser light source and performs magnification variation by moving at least a lens group along an optical axis, and the projection lens system fulfills conditional formula (1) below:

$$(|AC(B2-G)|+|AC(R2-G)|)/(|AC(B1-G)|+|AC(R1-G)|)<0.8 \quad (1)$$

where
$\lambda G$ represents a green laser wavelength;
$\lambda B2$ represents a blue laser wavelength;
$\lambda R2$ represents a red laser wavelength;
$\lambda B1$ represents a middle value of the green laser wavelength $\lambda G$ and the blue laser wavelength $\lambda B2$;
$\lambda R1$ represents a middle value of the green laser wavelength $\lambda G$ and the red laser wavelength $\lambda R2$;
$AC(B2-G)$ represents longitudinal chromatic aberration between the wavelengths $\lambda B2$ and $\lambda G$;
$AC(R2-G)$ represents longitudinal chromatic aberration between the wavelengths $\lambda R2$ and $\lambda G$;
$AC(B1-G)$ represents longitudinal chromatic aberration between the wavelengths $\lambda B1$ and $\lambda G$; and
$AC(R1-G)$ represents longitudinal chromatic aberration between the wavelengths $\lambda R1$ and $\lambda G$.

BRIEF DESCRIPTION OF THE DRAWINGS

FIGS. 5A to 5D are aberration diagrams at a wide-angle end of example 1;

FIGS. 6A to 6D are aberration diagrams at a middle focal length position of example 1;

FIGS. 7A to 7D are aberration diagrams at a telephoto end of example 1;

FIGS. 8A to 8D are aberration diagrams at a wide-angle end of example 2;

FIGS. 9A to 9D are aberration diagrams at a middle focal length position of example 2;

FIGS. 10A to 10D are aberration diagrams at a telephoto end of example 2;

FIGS. 11A to 11D are aberration diagrams at a wide-angle end of example 3;

FIGS. 12A to 12D are aberration diagrams at a middle focal length position of example 3;

FIGS. 13A to 13D are aberration diagrams at a telephoto end of example 3;

FIGS. 14A to 14D are aberration diagrams at a wide-angle end of example 4;

FIGS. 15A to 15D are aberration diagrams at a middle focal length position of example 4;

FIGS. 16A to 16D are aberration diagrams at a telephoto end of example 4;

DETAILED DESCRIPTION OF THE PREFERRED EMBODIMENTS

Figure 1:
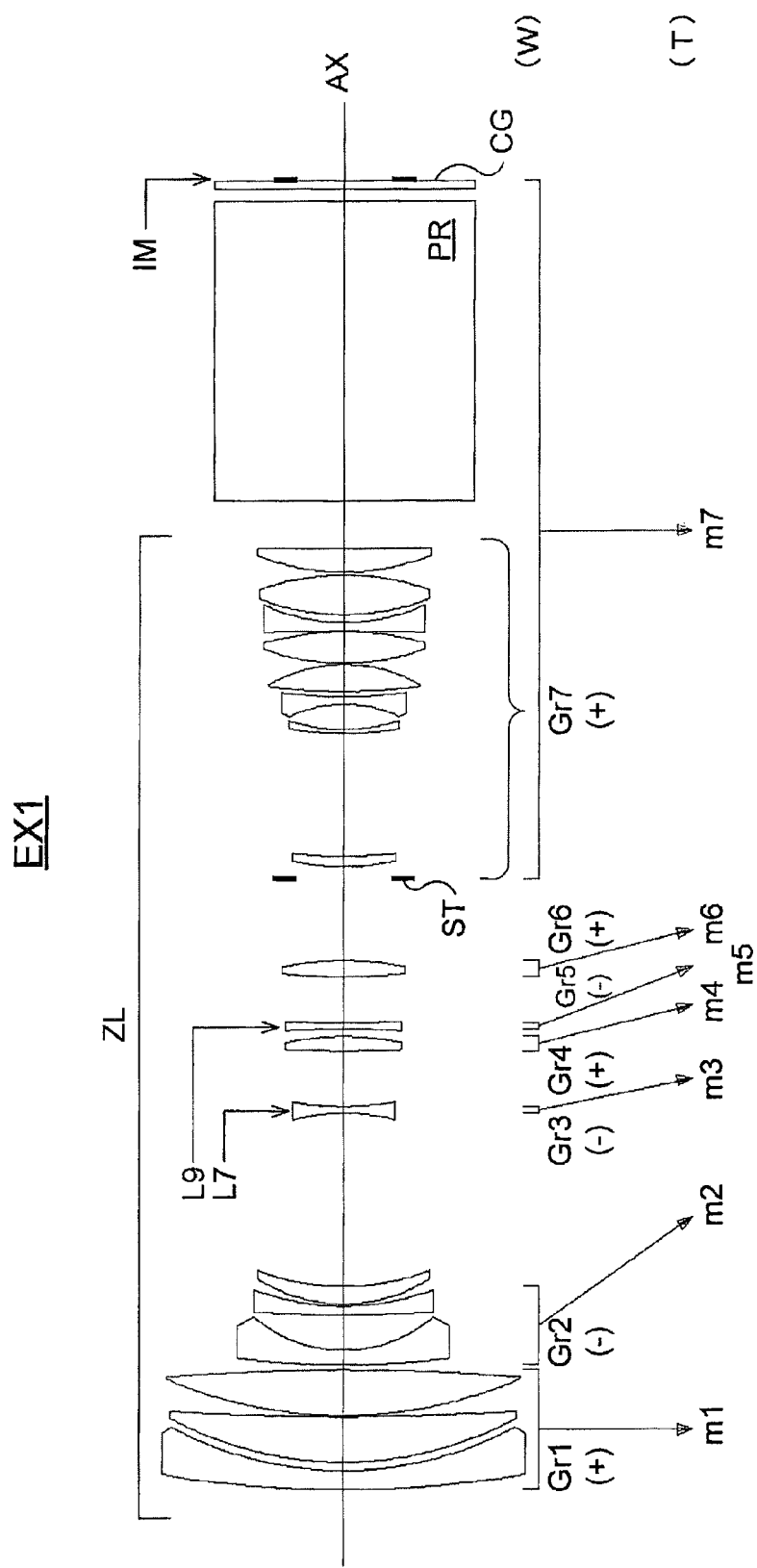
FIG. 1 is an optical construction diagram of a first embodiment (example 1)
Figure 2:
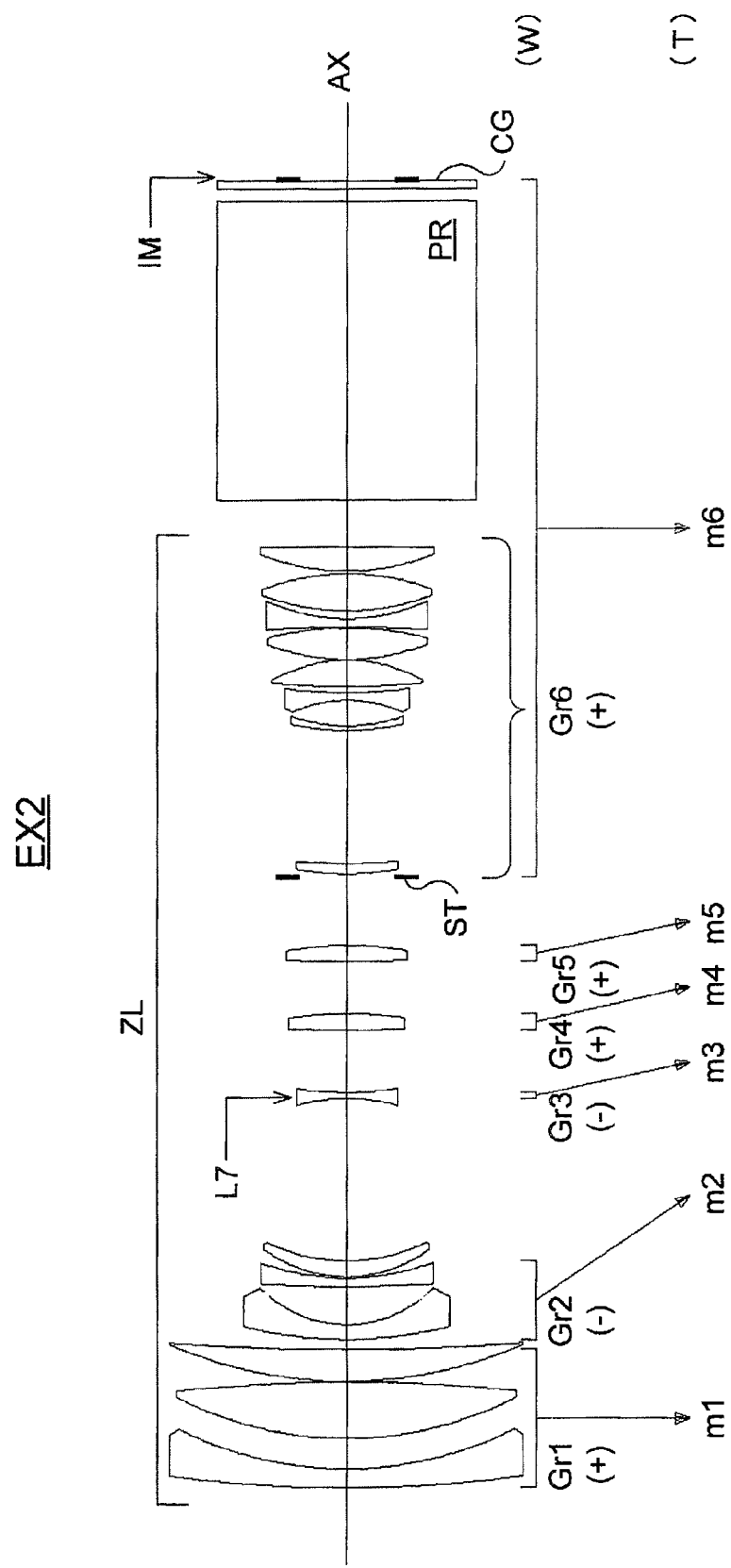
FIG. 2 is an optical construction diagram of a second embodiment (example 2)
Figure 3:
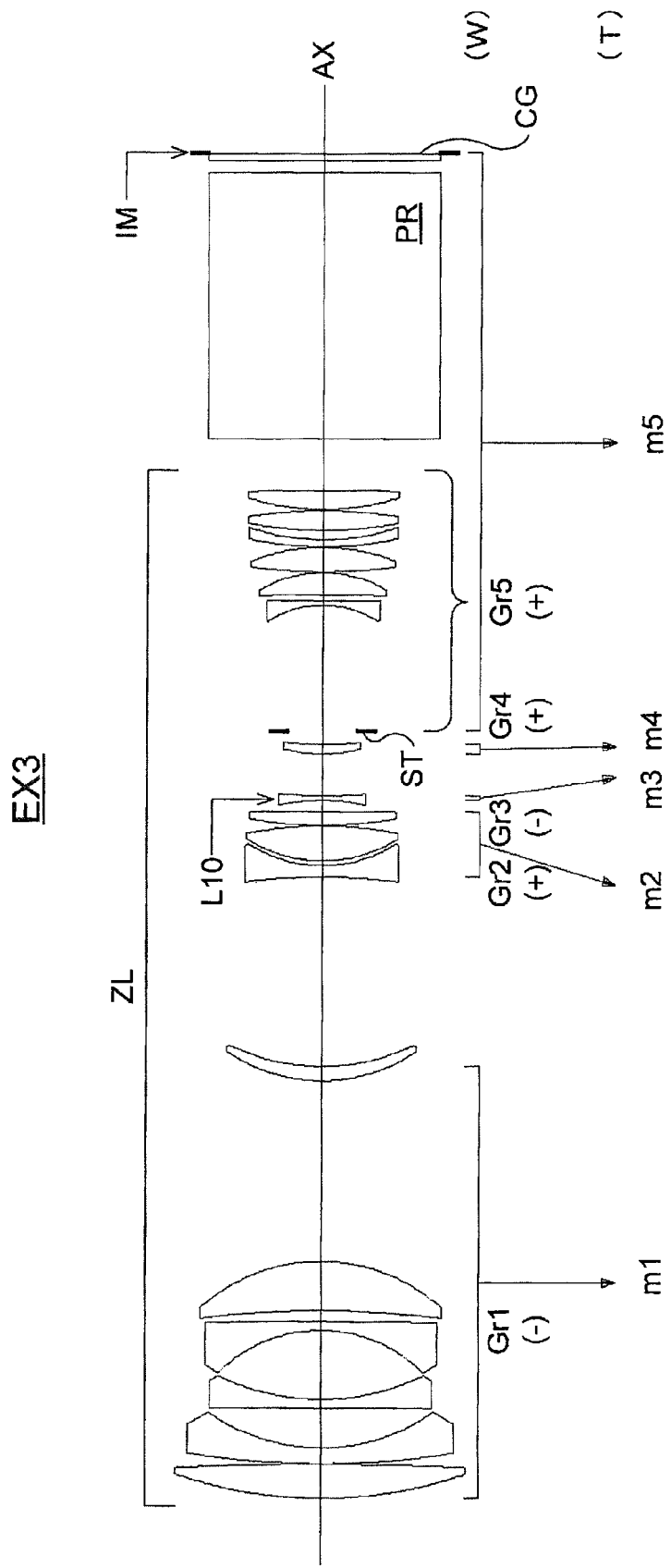
FIG. 3 is an optical construction diagram of a third embodiment (example 3)
Figure 4:
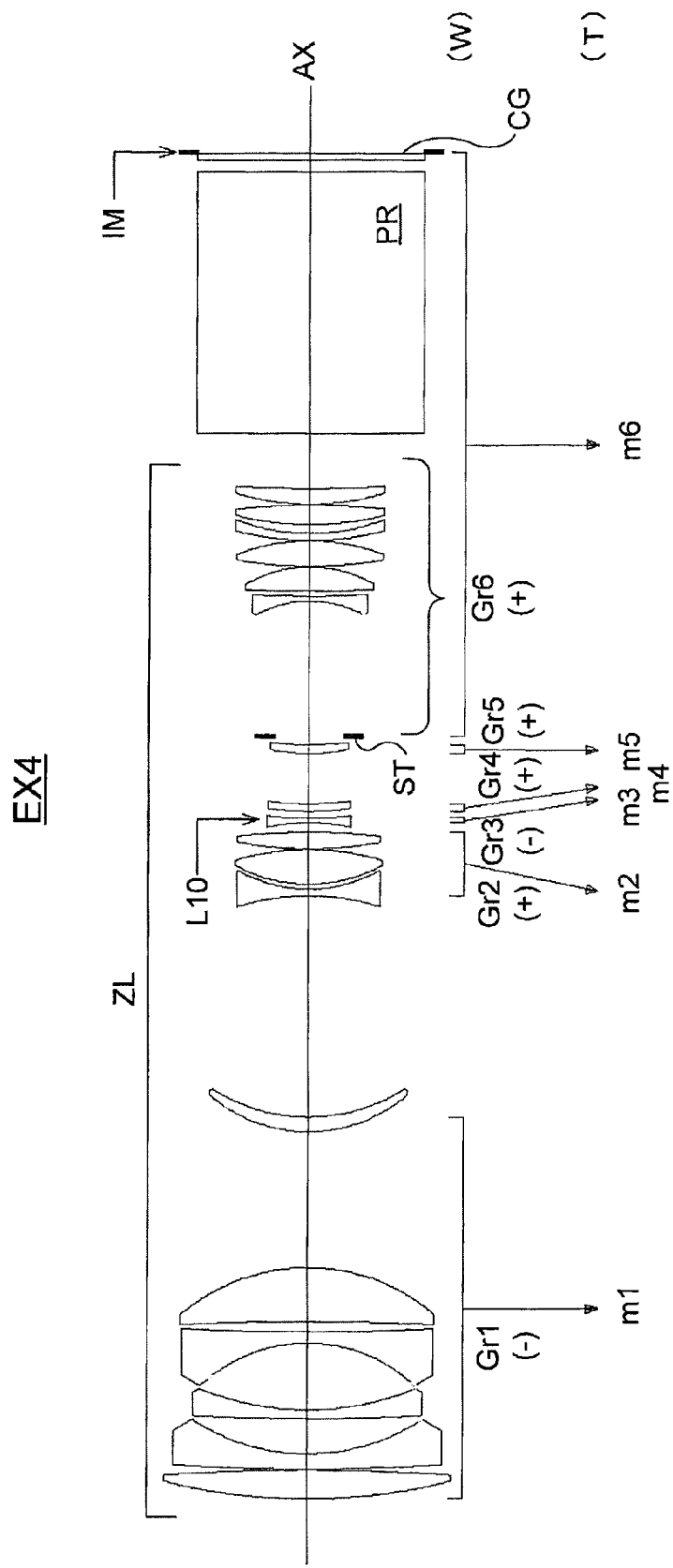
FIG. 4 is an optical construction diagram of a fourth embodiment (example 4)

Hereinafter, descriptions will be given of a projection lens system, a projector, and the like according to the present invention. A projection lens system according to the present invention is a zoom lens system which is for use with a laser light source and performs magnification variation by moving at least a lens group along the optical axis, and the projection lens system fulfills conditional formula (1) below:

$$(|AC(B2-G)|+|AC(R2-G)|)/(|AC(B1-G)|+|AC(R1-G)|)<0.8 \quad (1)$$

where $\lambda G$ represents a green laser wavelength;

$\lambda B2$ represents a blue laser wavelength;

$\lambda R2$ represents a red laser wavelength;

$\lambda B1$ represents a middle value of the green laser wavelength $\lambda G$ and the blue laser wavelength $\lambda B2$;

$\lambda B1$ represents a middle value of the green laser wavelength $\lambda G$ and the red laser wavelength $\lambda R2$;

$AC(B2-G)$ represents longitudinal chromatic aberration between the wavelengths $\lambda B2$ and $\lambda G$;

$AC(R2-G)$ represents longitudinal chromatic aberration between the wavelengths $\lambda R2$ and $\lambda G$;

$AC(B1-G)$ represents longitudinal chromatic aberration between the wavelengths $\lambda B1$ and $\lambda G$; and $AC(R1-G)$ represents longitudinal chromatic aberration between the wavelengths $\lambda R1$ and $\lambda G$.

With a white light source, even if the variation in chromatic aberration in zooming remains, satisfactory image quality is able to be achieved by correcting chromatic aberration simply by averaging the chromatic aberration within a particular wavelength range (within the red range or the blue range), but with a laser light source using only a particular wavelength, if variation in chromatic aberration remains in zooming as in the above case, it will degrade the image quality of a projection image in a particular zoom range. Conditional formula (1) indicates that longitudinal chromatic aberration is reduced more in the wavelength range of the laser light source than at the wavelengths $\lambda R1$ and $\lambda B1$ which are each in a middle of the three wavelengths. With a laser light source using only a particular wavelength, even if chromatic aberration occurs at the wavelengths $\lambda R1$ and $\lambda B1$ that are not used, a satisfactory image quality is able to be achieved simply by reducing chromatic aberration at the three wavelengths $\lambda G$, $\lambda R2$, and $\lambda B2$ that are used. Conversely, by allowing longitudinal chromatic aberration to occur at the wavelengths $\lambda R1$ and $\lambda B1$, which are not used, longitudinal chromatic aberration is reduced at the three wavelengths $\lambda G$, $\lambda R2$, and $\lambda B2$, which are used. Thus, by continuously keeping, in zooming, the chromatic aberration occurring at the wavelengths $\lambda G$, $\lambda R2$, and $\lambda B2$ used in the laser light source small, that is, by fulfilling conditional formula (1) throughout the entire zoom range, it is possible to achieve a zoom lens system capable of exploiting the wide color reproduction range of the laser light source throughout the entire zoom range.

According to the distinctive construction of the projection lens system described above, the adoption of the construction where longitudinal chromatic aberration fulfills a predetermined condition and the like makes it possible to achieve sufficiently small longitudinal chromatic aberration throughout the entire zoom range even in the wide color reproduction range of the laser light source while securing telecentricity and compactness throughout the entire zoom range. Furthermore, by adopting the projection lens system in projectors, it is possible to achieve projectors having high performance, high functionality, compactness, etc. Descriptions will now be given of conditions and the like for obtaining these advantages in a balanced manner, and for achieving higher optical performance, further compactness, and the like.

It is advisable that a projection lens system have, in the following order from the enlargement side, a first lens group, a second lens group which is movable, and at least two movable lens groups disposed closer to the reduction side than the second lens group, and that, let a lens group located next to the second lens group on a reduction side of the second lens group be a third lens group, each lens element included in the movable lens groups from the third lens group onward fulfill conditional formula (2) below:

$$0.4<\{fw^2\times\Sigma(hw\times hw\times\Delta\theta g,F\times pi/Vd)\}/\{ft^2\times\Sigma(ht\times ht\times\Delta\theta g,F\times pi/Vd)\}<2.5 \quad (2)$$

where $\Delta\theta g,F$ represents an anomalous dispersion characteristic of each lens glass material;

pi represents a refractive power of each lens;

fw represents a focal length at a wide-angle end;

ft represents a focal length at a telephoto end;

hw represents a light ray passing height of on-axis marginal light at the wide-angle end;

ht represents a light ray passing height of on-axis marginal light at the telephoto end; and Vd represents dispersion (an Abbe number) of each lens glass material.

Here, the anomalous dispersion characteristic is a parameter indicating the degree of difference from normal dispersion glass. Generally, if a partial dispersion ratio $\theta g,F$ and the dispersion (the Abbe number) Vd are plotted on a graph where the vertical axis indicates the partial dispersion ratio $\theta g,F$ and the horizontal axis indicates the dispersion (the Abbe number) Vd, there is a substantially linear relationship therebetween, and glass on the line is called normal dispersion glass.

The stronger the anomalous dispersion characteristic of glass is, the more effectively the glass corrects chromatic aberration.

The anomalous dispersion characteristic $\Delta\theta g, F$ of a lens glass material is represented by the formula: $\theta g, F = ag, F + bg, F \times Vd + \Delta\theta g, F$. Here, the partial dispersion ratio is: $\theta g, F = (ng - nF)/(nF - nC)$, where ng, nF, and nC are refractive indexes with respect to g-line, F-line, and C-line, respectively. Here, ag,F and bg,F are constants, which are equal to 0.648327 and −0.0018024, respectively.

Conditional formula (2) represents a ratio between amounts of longitudinal chromatic aberration correction performed by a lens element in the movable lens groups from the third lens group onward at the wide-angle end and at the telephoto end derived according to the aberration theory. By fulfilling conditional formula (2), the variation in the amount of longitudinal chromatic aberration correction at the wide-angle end and at the telephoto end becomes small, and this makes it easier to make longitudinal chromatic aberration small at a particular wavelength throughout the entire zoom range. Upper and lower limits of conditional formula (2) are each set to a value advisable in view of variation in longitudinal chromatic aberration in zooming. By fulfilling conditional formula (2), it is possible to further reduce the variation in chromatic aberration occurring at a laser wavelength.

According to the aberration theory, the amount of chromatic aberration correction performed by a lens element is proportional to the light ray passing height of on-axis marginal light in addition to the anomalous dispersion characteristic and the refractive power of the lens element. Thus, the amount of chromatic aberration correction by each of the movable lens groups from the third lens group onward varies due to magnification variation. In the above construction, by providing the plurality of movable lens groups from the third lens group onward, the amount of lateral chromatic aberration variation is controlled on the lens group by lens group basis, and the variation caused by magnification variation in the amount of chromatic aberration correction performed by all the movable lens groups from the third lens group onward is reduced.

In the case of a projection lens system for projectors, a color combining prism and the like need to be introduced, and thus, it is necessary to secure a long back focus. Thus, the projection lens system is constructed as a retrofocus type having a negative optical power in a front lens group and a positive optical power in a rear lens group (the optical power is an amount defined as the reciprocal of a focal length). In that case, the light ray passing position of the on-axis marginal light is increasingly lower toward the enlargement side, and this makes longitudinal chromatic aberration correction less effective.

In addition to providing the movable lens groups from the third lens group onward that correct longitudinal chromatic aberration, by constructing the second lens group as a magnification variation lens group which tends to move by a large moving amount, it is possible, throughout the entire zoom range, to locate the movable lens groups from the third lens group onward at positions close to the aperture stop where it is easy to correct longitudinal chromatic aberration, and thus to achieve efficient correction of longitudinal chromatic aberration. It is preferable that the movable lens groups from the third lens group onward be each composed of two or less lens elements, by constructing the movable lens groups from the third lens group onward, which correct chromatic aberration, such that they are each composed of two or less lens elements. A sufficient moving amount for the movable lens groups from the third lens group onward can be secured without locating them apart from the position of the aperture stop, and efficient correction of longitudinal chromatic aberration can be achieved without increasing the size of a projection optical system.

It is advisable that conditional formula (3) below be fulfilled:

$$T3s/TLw < 0.3 \quad (3)$$

where $T3s$ represents a maximum distance along the optical axis between a lens surface of the movable lens groups from the third lens group onward and the aperture stop (in the examples discussed later, a lens surface of the movable lens groups from the third lens group onward to which conditional formula (3) is applied corresponds to a surface of the third lens group that is located closest to the enlargement side); and TLw represents a total lens length at the wide-angle end.

Conditional formula (3) defines a position of longitudinal chromatic aberration correcting lens groups (the movable lens groups from the third lens group onward). That is, conditional formula (3) indicates that the movable lens groups from the third lens group onward are located close to the aperture stop. If the movable lens groups from the third lens group onward are located far away from the aperture stop, the effect of correcting longitudinal chromatic aberration is lowered. The value of an upper limit of conditional formula (3) is set from a viewpoint of achieving effective correction of longitudinal chromatic aberration.

It is more advisable to fulfill conditional formula (3a) below:

$$0.05 < T3s/TLw < 0.25 \quad (3a)$$

Conditional formula (3a) defines, among the conditional range defined by conditional formula (3) above, a more preferable conditional range based on the above-mentioned viewpoint and the like. If the value of $T3s/TLw$ is under a lower limit of conditional formula (3a), the moving amount of the longitudinal chromatic aberration correcting lens groups is small, and thus, in this case as well, it is difficult to achieve effective correction of longitudinal chromatic aberration. Thus, preferably, by fulfilling conditional formula (3a), it is possible to further enhance the above described advantages.

It is advisable to fulfill conditional formula (4) below:

$$0.2 < |T\text{max}/T2| < 0.8 \quad (4)$$

where

Tmax represents a maximum moving amount of the movable lens groups from the third lens group onward in magnification variation; and T2 represents a moving amount of the second lens group in magnification variation.

Conditional formula (4) defines a ratio of the moving amount of the longitudinal chromatic aberration correcting lens groups to that of the second lens group. If the moving amount of the longitudinal chromatic aberration correcting lens groups is too large, they move during zooming to a position away from the aperture stop, where the effect of longitudinal chromatic aberration correction is low. On the other hand, if the moving amount of the longitudinal chromatic aberration correcting lens groups is too small, correction of longitudinal chromatic aberration correction has only a small effect. An advisable value of the moving amount of the longitudinal chromatic aberration correcting lens groups is set considering these viewpoints. Further, in a case where the longitudinal chromatic aberration correcting lens groups are placed close to the aperture stop to achieve effective correction of longitudinal chromatic aberration, it is impossible to obtain sufficient effect of magnification variation by using the longitudinal chromatic aberration correcting lens groups alone, and thus, in the above construction, magnification variation is performed mainly by the second lens group. Thus, the second lens group needs to have a larger moving amount than the longitudinal chromatic aberration correcting lens groups, and from this viewpoint as well, it is advisable to fulfill conditional formula (4).

It is advisable that the movable lens groups from the third lens group onward include at least a lens group having a negative optical power and at least a lens group having a positive optical power. This construction makes it possible for longitudinal chromatic aberration occurring in the lens group having the positive optical power to be corrected in the lens group having the negative optical power, and thus, longitudinal chromatic aberration can be corrected efficiently in the movable lens groups from the third lens group onward.

It is advisable that the third lens group have a negative optical power. While longitudinal chromatic aberration varies depending on the passing position of the on-axis marginal light ray as has been described in the description of conditional formula (2), lateral chromatic aberration varies depending on the principal light-ray passing position of an off-axis light ray. The third lens group, having a negative optical power, is able to greatly bend the off-axis light ray, and this makes it possible to make the off-axis principal light ray pass through the third lens group at a low passing position. As a result, it is possible to reduce the variation in lateral chromatic aberration caused by the third lens group. On the other hand, passing positions of off-axis and on-axis light rays overlap each other in the third lens group, and thus, the light ray passing position of the marginal light ray of the on-axis light is higher than that of the principal light ray of the off-axis light. This makes it possible to make longitudinal chromatic aberration more variable than lateral chromatic aberration at the third lens group. This applies not only to the third lens group but also to the movable lens groups which are disposed past the third lens group and through which the off-axis light and the on-axis light pass at positions close to each other.

Let a lens group located on the reduction side of, next to, the third lens group be a fourth lens group, it is preferable that the fourth lens group have a positive optical power. With this construction, it is possible to reduce longitudinal chromatic aberration occurring, for example, in the third lens group efficiently in the fourth lens group where the height of the on-axis marginal light ray is close to that in the third lens group, and this makes it still easier to reduce longitudinal chromatic aberration in magnification variation.

It is advisable that each lens element having a negative optical power and included in the movable lens groups from the third lens group onward fulfill conditional formula (5) below:

$$\Delta\theta g, F > 0 \quad (5)$$

where $\Delta\theta g, F$ represents an anomalous dispersion characteristic of each lens glass material.

If conditional formula (5) is fulfilled, it means that all the negative lens elements in the longitudinal chromatic aberration correcting lens groups have an anomalous dispersion characteristic of Lang. Thus, by fulfilling conditional formula (5), it is possible to achieve a so-called apochromat which is capable of bending longitudinal chromatic aberration toward a minus side on a short-wavelength side and reducing chromatic aberration at three wavelengths.

It is advisable that the first lens group be stationary during magnification variation. With this construction, it is possible to simplify the construction of the first lens-group frame whose diameter tends to be large, to reduce cost increase.

It is advisable that a lens group disposed closest to the reduction side be stationary in magnification variation. With this construction, it is possible to reduce variation in telecentricity in magnification variation.

It is advisable that the lens group disposed closest to the reduction side have a positive optical power. With this construction, it is easy to secure telecentricity.

It is advisable that the movable lens groups disposed closer to the reduction side than the third lens group are each composed of a single lens element. With this construction, it is easier to secure the moving amount of the movable lens groups from the third lens group onward. This makes it possible to correct longitudinal chromatic aberration efficiently.

It is advisable that the movable lens groups disposed closer to the reduction side than the third lens group be all located closer to the enlargement side than the aperture stop. By disposing all the movable lens groups closer to the enlargement side than the aperture stop, a lens group disposed closer to the reduction side than the aperture stop can be made stationary, and variation in telecentricity caused by magnification variation can be reduced. In a case where there is a zoom position where telecentricity deteriorates in magnification variation, the angle of off-axis light is increased at such a position, and this lowers efficiency particularly in combining colors by using a dichroic prism or in extracting illumination light by using a TIR prism.

Next, specific optical constructions of a projection lens system ZL will be described dealing with first to fourth embodiments. FIGS. 1 to 4 are lens construction diagrams corresponding to projection lens systems ZL of the first to fourth embodiments, respectively, and the figures each illustrate a lens arrangement at the wide-angle end (W) and the like in a form of optical cross section. In each of the lens construction diagrams, arrows Ink (k=1, 2, 3 . . . ) each schematically indicate how a kth lens group Grk moves during zooming from the wide-angle end (W) through the telephoto end (T). Note that the first lens group Gr1 and the lens group disposed closest to the reduction side are stationary lens groups, and arrows corresponding to those lens groups indicate that they are stationary during zooming. A prism PR (for example, a TIR prism, a color separating/combining prism, and the like) positioned on the reduction side of the lens group that is disposed closest to the reduction side and a cover glass CG of an image display device are also stationary during zooming.

The projection lens systems ZL of the first to fourth embodiments (FIGS. 1 to 4) are each a projector zoom lens system in which at least a first lens group Gr1 and a lens group (a final lens group) disposed closest to the reduction side are stationary lens groups and the other lens groups are movable lens groups, and which performs magnification variation by moving the movable lens groups along an optical axis AX. The projection lens systems ZL each has, as zoom lens groups, the first lens group Gr1, a second lens group Gr2 which is movable, and at least two movable lens groups each composed of two or less lens elements and disposed closer to the reduction side then the second lens group Gr2. For example, the first embodiment is a zoom lens system composed of seven lens groups respectively having positive, negative, negative, positive, negative, positive, and positive optical powers in this order from the enlargement side; the second embodiment is a zoom lens system composed of six lens groups respectively having positive, negative, negative, positive, positive, and positive optical powers in this order from the enlargement side; the third embodiment is a zoom lens system composed of five lens groups respectively having negative, positive, negative, positive, and positive optical powers in this order from the enlargement side; and the fourth embodiment is a zoom lens system composed of six lens groups respectively having negative, positive, negative, positive, positive, and positive optical powers in this order from the enlargement side.

Figure 18:
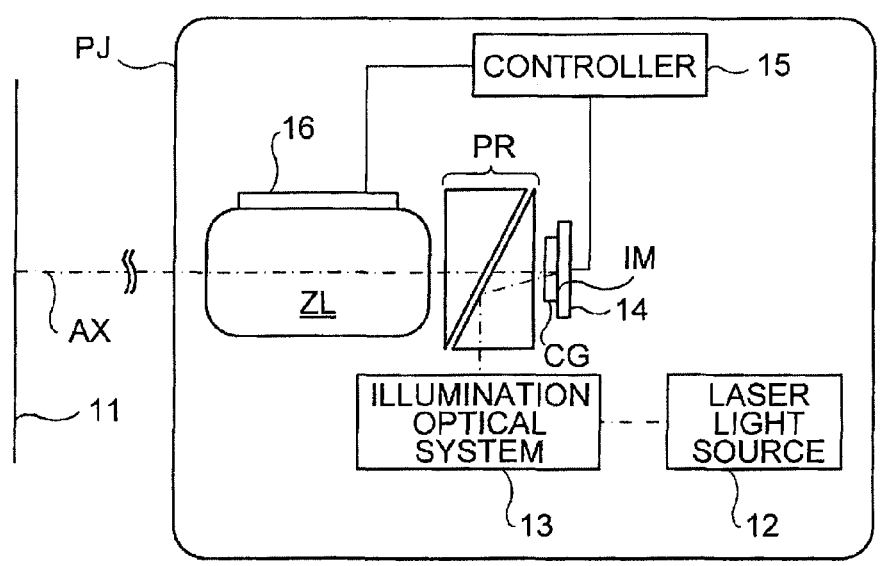
FIG. 18 is a schematic diagram illustrating an embodiment of a projector.

Next, a description will be given of an embodiment of a projector to which a projection lens system ZL is applied. FIG. 18 illustrates a schematic construction example of the projector PJ. The projector PJ is provided with a laser light source 12, an illumination optical system 13, an image display device 14, a controller 15, an actuator 16, a prism PR, a projection lens system ZL, etc. The controller 15 is a portion that performs overall control of the projector PJ. The image display device 14 is an image modulation device (for example, a digital micromirror device) that modulates light to generate an image, and a cover glass CG is provided over an image display surface TM where images are displayed. Laser light from the laser light source 12 is directed through the illumination optical system 13 and the prism PR to the image display device 14. The prism PR is composed of, for example, a TIR prism, a color separating/composing prism, etc., and, for example, separates illumination light from projection light. An image displayed on the image display device 14 is enlarged and projected onto a screen surface 11 by the projection lens system ZL.

To the lens groups that move in the projection lens system ZL for zooming and focusing, an actuator 16 is connected for moving the lens groups along the optical axis AX toward the enlargement or reduction side. To the actuator 16, the controller 15 is connected to control the movement of the movable lens groups. Instead of using the controller 15 and the actuator 16, the lens groups may be moved manually.

EXAMPLES

Hereinafter, more specific descriptions will be given of the construction of a projection lens system and the like embodying the present invention, dealing with construction data of examples and the like. Examples 1 to 4 (EX 1 to 4) dealt with here are numerical examples corresponding to the above-discussed first to fourth embodiments, respectively, and the optical construction diagrams (FIGS. 1 to 4) illustrating the first to fourth embodiments each illustrate the lens construction and the like of the corresponding one of examples 1 to 4.

The construction data of each example includes, as surface data, from left through right columns, surface number i, radius of curvature r (mm), axial surface-to-surface distance t (mm), refractive index with respect to d-line (wavelength 587.56 nm) Nd, and Abbe number with respect to d-line Vd. The construction data further includes, as miscellaneous data, a zoom ratio (ZR), an image height (Y', mm), a focal length of the entire optical system (f, mm), an F-number (FNo), a half angle of view (ω, °), a back focus (BF, mm), and a total lens length (TL, mm), and further, the construction data further includes, as zoom lens group data, a focal length (mm) of each lens group. The back focus BF is expressed as an equivalent air length corresponding to a distance between a final lens surface and a paraxial image plane IM, and the total lens length TL is obtained by adding the back focus to a distance between the front-most lens surface and the final lens surface. Besides, table 1 indicates values corresponding to the conditional formulae with respect to each example (a jth lens denoted by Lj (j=1, 2, 3 ...)).

FIGS. 5 to 16 are aberration diagrams corresponding to examples 1 to 4 (EX 1 to EX 4) (object distance: ∞), and more specifically, FIGS. 5, 8, 11, and 14 each illustrate various aberrations at the wide-angle end (W), FIGS. 6, 9, 12, and 15 each illustrate various aberrations at a middle focal length position (M denoting a middle focal length state), and FIGS. 7, 10, 13, and 16 each illustrate various aberrations at the telephoto end (T). In each of FIGS. 5 to 16, (A) illustrates spherical aberration (mm), (B) illustrates astigmatism (mm), (C) illustrates distortion aberration (%), and (D) illustrates lateral chromatic aberration (mm) (H denoting the incidence height, and Y' denoting the maximum image height).

In the spherical aberration diagrams (A), the solid line, the one-dotted-chain line, and the two-dotted chain line indicate spherical aberrations with respect to the wavelengths of 525 nm, 445 nm, and 640 nm, respectively; and the broken line indicates the amount of dissatisfaction with respect to the sine condition. In the astigmatism diagrams (B), DS denotes a sagittal image plane and DT denotes a tangential image plane. In the sagittal image plane DS, the solid line, the one-dotted-chain line, and the two-dotted chain line indicate astigmatisms with respect to the wavelengths of 525 nm, 445 nm, and 640 nm, respectively; and in the tangential image plane DT, the shortest-interval broken line, the second shortest-interval broken line, and the longest-interval broken line indicate astigmatisms with respect to the wavelengths of 525 nm, 445 nm, and 640 nm, respectively. In the distortion aberration diagrams (C), the solid line indicates a distortion (%) with respect to the wavelength of 525 nm. In the lateral chromatic aberration diagrams (D), the solid line and the broken line indicate lateral chromatic aberrations with respect to the wavelengths of 445 nm and 640 nm, respectively.

Figure 17:
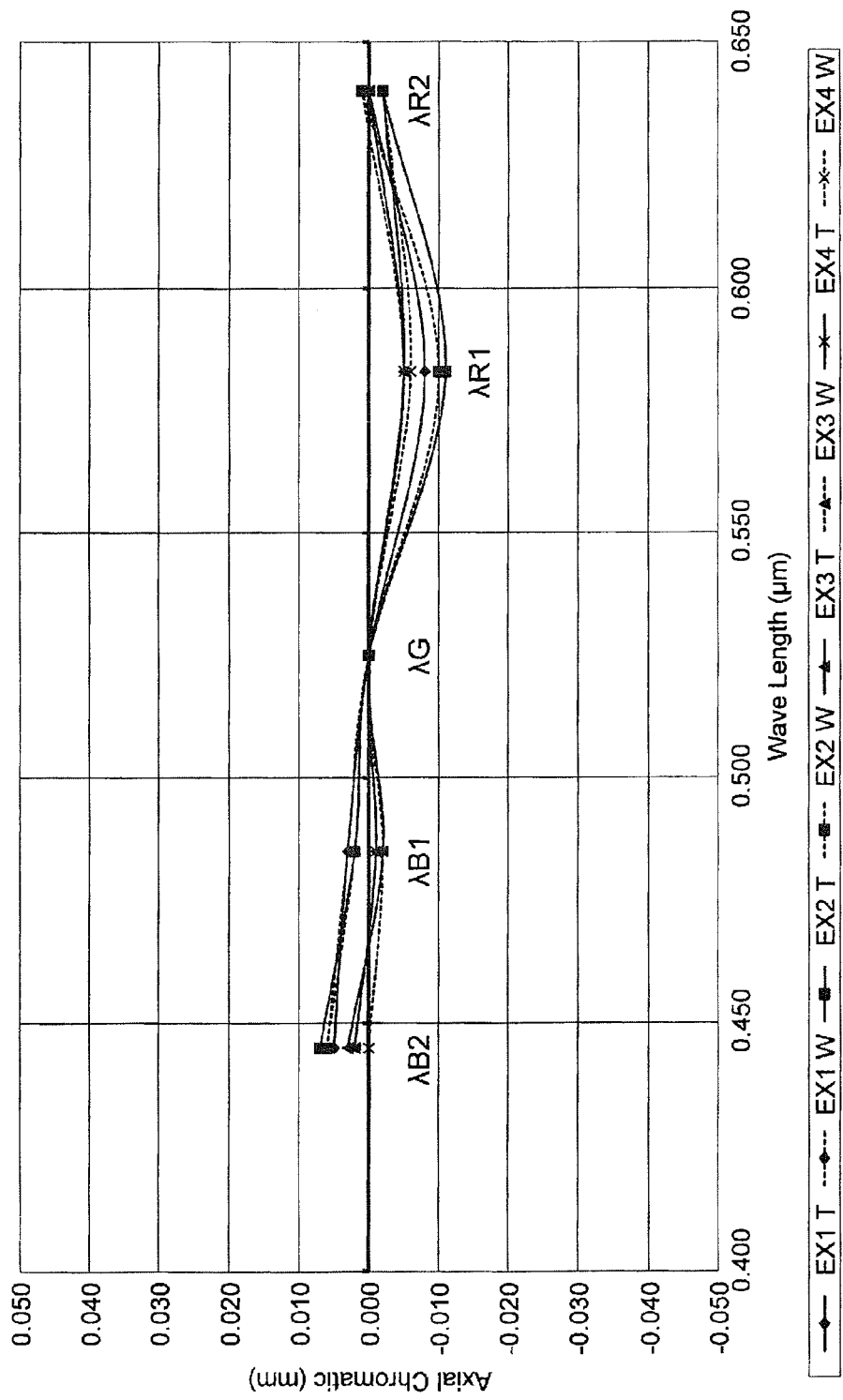
FIG. 17 is a graph illustrating longitudinal chromatic aberrations of the examples.

Longitudinal chromatic aberrations in the examples are illustrated in the graph of FIG. 17. In the graph, the vertical axis indicates the longitudinal chromatic aberration (mm) and the horizontal axis indicates the wavelength (μm). The examples all fulfill conditional formula (1). For example, the graph shows that longitudinal chromatic aberration is corrected more at the wavelength $\lambda B2$ which is farther away from the wavelength $\lambda G$ than the wavelength $\lambda B1$ which is close to the wavelength $\lambda G$, and that the state of correction does not vary throughout the entire zoom range from the wide-angle end (W) through the telephoto end (T).

In a case where each example is used as a projection lens system ZL in a projector (for examples, a liquid crystal projector) PJ, a screen surface (a projection surface) 11 is generally an image plane and an image display surface IM (for example, a liquid crystal panel surface) is generally an object plane, but the examples are each constructed as a reduction system in terms of optical design, the screen surface 11 (FIG. 18) is regarded as the object plane, and the optical performances of the examples are evaluated at the image display surface IM. And, as will be understood from the obtained optical performances, the zoom lens system of each example is preferably usable not only as a projection lens system for projectors but also as an imaging lens system for imaging devices (for example, a video camera and a digital camera).

The projection lens system ZL of example 1 is a zoom lens system composed of seven lens groups respectively having positive, negative, negative, positive, negative, positive, and positive optical powers. In magnification variation, a first lens group Gr1 and a seventh lens group Gr7 disposed closer to the reduction side than an aperture stop ST are stationary. In magnification variation from the wide-angle end (W) through the telephoto end (T), lens groups from a second lens group Gr2 through a sixth lens group Gr6 all move monotonously toward the reduction side, the second lens group Gr2 moving by the largest moving amount.

In each of the movable lens groups from the third lens group Gr3 onward, the on-axis marginal light ray passing position is high throughout the entire zoom range. In each of the movable lens groups from the third lens group Gr3 onward, the light ray passing position of off-axis light substantially overlaps the light ray passing position of on-axis light throughout the entire zoom range, and thus the passing position of the off-axis principal light ray is low. Thus, lateral chromatic aberration is unlikely to vary in the movable lens groups from the third lens group Gr3 onward, and it is chiefly longitudinal chromatic aberration that varies.

In example 1, the third lens group Gr3 and the fifth lens group Gr5 are each composed of a negative single lens element, the fourth lens group Gr4 and the sixth lens group Gr6 are each composed of a positive single lens element, and the negative lens elements (seventh and ninth lens elements L7 and L9) of the third and fifth lens groups Gr3 and Gr5 bend short wavelengths toward the minus side, and thus an apochromat is achieved. Furthermore, lens groups from the third lens group Gr3 through the sixth lens group Gr6 each move independently in zooming to reduce variation in longitudinal chromatic aberration correction amount during zooming, and thereby, variation caused in longitudinal chromatic aberration by zooming is reduced.

In example 1, the number of lens elements is 18, the magnification variation ratio is 1.64×, and the exit pupil position is located 52027 mm away from the reduction side image position. Thus, it is possible to achieve a compact projection lens system where variation in longitudinal chromatic aberration is small in zooming.

The projection lens system ZL of example 2 is a zoom lens system composed of six lens groups respectively having positive, negative, negative, positive, positive, and positive optical powers. In magnification variation, a first lens group Gr1 and a sixth lens group Gr6 disposed closer to the reduction side than an aperture stop ST are stationary. In magnification variation from the wide-angle end (W) through the telephoto end (T), lens groups from a second lens group Gr2 through a fifth lens group Gr5 all move monotonously toward the reduction side, the second lens group Gr2 moving by the largest moving amount.

In each of the movable lens groups from the third lens group Gr3 onward, the on-axis marginal light ray passing position is high throughout the entire zoom range. In each of the movable lens groups from the third lens group Gr3 onward, the light ray passing position of off-axis light substantially overlaps the light ray passing position of on-axis light throughout the entire zoom range, and thus the passing position of the off-axis principal light ray is low. Thus, lateral chromatic aberration is unlikely to vary in the movable lens groups from the third lens group Gr3 onward, and it is chiefly longitudinal chromatic aberration that varies.

In example 2, a third lens group Gr3 is composed of a negative single lens element, a fourth lens group Gr4 and a fifth lens group Gr5 are each composed of a positive single lens element, and the negative lens element (a seventh lens element L7) of the third lens group Gr3 bends short wavelengths toward the minus side, and thus an apochromat is achieved. Furthermore, lens groups from the third lens group Gr3 through the fifth lens group Gr5 each move independently in zooming to reduce variation in longitudinal chromatic aberration correction amount during zooming, and thereby, variation caused by zooming in longitudinal chromatic aberration is reduced.

In example 2, the number of lens elements is 17, the magnification variation ratio is 1.64×, and the exit pupil position is located 189607 mm away from the reduction side image position. Thus, it is possible to achieve a compact projection lens system where variation in longitudinal chromatic aberration is small during zooming.

The projection lens system ZL of example 3 is a zoom lens system composed of five lens groups respectively having negative, positive, negative, positive, and positive optical powers. In magnification variation, first and fifth lens groups Gr1 and Gr5 disposed closer to the reduction side than an aperture stop ST are stationary. In magnification variation from the wide-angle end (W) through the telephoto end (T), a second lens group Gr2 monotonously moves to the enlargement side, and third and fourth lens groups Gr3 and Gr4 monotonously move to the reduction side, the second lens group Gr2 moving by the largest moving amount.

In each of the movable lens groups from the third lens group Gr3 onward, the on-axis marginal light ray passing position is high throughout the entire zoom range. In each of the movable lens groups from the third lens group Gr3 onward, the light ray passing position of off-axis light substantially overlaps the light ray passing position of on-axis light throughout the entire zoom range, and thus the passing position of the off-axis principal light ray is low. Thus, lateral chromatic aberration is unlikely to vary in the movable lens groups from the third lens group Gr3 onward, and it is chiefly longitudinal chromatic aberration varies.

In example 3, the third lens group Gr3 is composed of a negative single lens element, the fourth lens group Gr4 is composed of a positive single lens element, and the negative lens element (a tenth lens element L10) of the third lens group Gr3 bends short wavelengths toward the minus side, and thus an apochromat is achieved. Furthermore, the third lens group Gr3 and the fourth lens group Gr4 each move independently in zooming to reduce variation in longitudinal chromatic aberration correction amount during zooming, and thereby, variation in longitudinal chromatic aberration caused by zooming is reduced.

In example 3, the number of lens elements is 17, the magnification variation ratio is 1.27×, and the exit pupil position is located 5459 mm away from the reduction side image position. Thus, it is possible to achieve a compact projection lens system where variation in longitudinal chromatic aberration is small in zooming.

The projection lens system ZL of example 4 is a zoom lens system composed of six lens groups respectively having negative, positive, negative, positive, positive, and positive optical powers. In magnification variation, a first lens group Gr1 and a sixth lens group Gr6 disposed closer to the reduction side than an aperture stop ST are stationary. In magnification variation from the wide-angle end (W) to the telephoto end (T), second and fifth lens groups Gr2 and Gr5 monotonously move to the enlargement side, and third and fourth lens groups Gr3 and Gr4 monotonously move to the reduction side, the second lens group Gr2 moving by the largest moving amount.

In each of the movable lens groups from the third lens group Gr3 onward, the on-axis marginal light ray passing position is high throughout the entire zoom range. In each of the movable lens groups from the third lens group Gr3 onward, the light ray passing position of off-axis light substantially overlaps the light ray passing position of on-axis light throughout the entire zoom range, and thus the passing position of the off-axis principal light ray is low. Thus, lateral chromatic aberration is unlikely to vary in the movable lens groups from the third lens group Gr3 onward, and it is chiefly longitudinal chromatic aberration that varies.

In example 4, a third lens group Gr3 is composed of a negative single lens element, fourth and fifth lens groups Gr4 and Gr5 are each composed of a positive single lens element, and the negative lens element (a tenth lens element L10) of the third lens group Gr3 bends short wavelengths toward the minus side, and thus an apochromat is achieved. Furthermore, lens groups from the third lens group Gr3 through the fifth lens group Gr5 each move independently in zooming to reduce variation in amount of longitudinal chromatic aberration correction during zooming, and thereby, variation in longitudinal chromatic aberration caused by zooming is reduced.

In example 4, the number of lens elements is 18, the magnification variation ratio is 1.25×, and the exit pupil position is located 6788 mm away from the reduction side image position. Thus, it is possible to achieve a compact projection lens system where variation in longitudinal chromatic aberration is small in zooming.

Example 1 unit: mm

Surface Data

| i | r | t | Nd | Vd |
|---|---|---|---|---|
| 1 | 434.478 | 7.400 | 1.80610 | 40.73 |
| 2 | 142.194 | 3.281 | | |
| 3 | 143.271 | 17.732 | 1.48749 | 70.45 |
| 4 | 1249.605 | 0.300 | | |
| 5 | 174.785 | 17.717 | 1.48749 | 70.45 |
| 6 | −851.127 | 2.000~51.575~85.600 | | |
| 7 | 366.860 | 5.600 | 1.49700 | 81.61 |
| 8 | 53.942 | 13.797 | | |
| 9 | 657.771 | 3.300 | 1.49700 | 81.61 |
| 10 | 98.654 | 0.838 | | |
| 11 | 62.606 | 6.866 | 1.72916 | 54.66 |
| 12 | 96.254 | 66.698~30.159~7.136 | | |
| 13 | −71.759 | 2.400 | 1.75520 | 27.52 |
| 14 | 123.595 | 21.624~25.682~27.368 | | |
| 15 | 620.855 | 5.604 | 1.74077 | 27.75 |
| 16 | −115.118 | 3.000~17.589~19.271 | | |
| 17 | −330.930 | 2.400 | 1.67270 | 32.17 |
| 18 | 497.070 | 17.952~5.633~2.000 | | |
| 19 | 240.649 | 6.331 | 1.65844 | 50.84 |
| 20 | −123.002 | 32.101~12.738~2.000 | | |
| 21 (Aperture Stop) | ∞ | 4.724 | | |
| 22 | 94.248 | 4.076 | 1.75520 | 27.52 |
| 23 | 197.383 | 48.196 | | |
| 24 | 126.654 | 1.600 | 1.56732 | 42.85 |
| 25 | 68.499 | 9.849 | | |
| 26 | −50.770 | 3.000 | 1.80610 | 40.73 |
| 27 | 184.660 | 2.263 | | |
| 28 | 253.147 | 10.462 | 1.49700 | 81.61 |
| 29 | −59.213 | 0.427 | | |
| 30 | 90.040 | 12.454 | 1.49700 | 81.61 |
| 31 | −116.160 | 0.300 | | |
| 32 | −995.684 | 3.300 | 1.80610 | 40.73 |
| 33 | 74.180 | 3.099 | | |
| 34 | 92.933 | 15.436 | 1.49700 | 81.61 |
| 35 | −99.663 | 1.080 | | |
| 36 | 90.593 | 9.345 | 1.49700 | 81.61 |
| 37 | ∞ | 18.450 | | |
| 38 | ∞ | 116.500 | 1.51680 | 64.20 |
| 39 | ∞ | 5.000 | | |
| 40 | ∞ | 3.000 | 1.48749 | 70.45 |
| 41 | ∞ | 0.500 | | |
| 42 | ∞ | | | |

Miscellaneous Data

ZR = 1.64
Y' = 19.14
f = 49.887~65.761~81.635
FNo = 3.401~3.400~3.400
ω = 20.986~16.031~12.998
BF = 109.014~109.011~109.011
TL = 466.219~466.217~466.216

Zoom Lens Group Data

| lens group | (surface) | focal length |
|---|---|---|
| 1 | (1-6) | 379.764 |
| 2 | (7-12) | −124.990 |
| 3 | (13-14) | −59.801 |
| 4 | (15-16) | 131.522 |
| 5 | (17-18) | −294.982 |
| 6 | (19-20) | 124.482 |
| 7 | (21-37) | 125.444 |

Example 2 unit: mm

Surface Data

| i | r | t | Nd | Vd |
|---|---|---|---|---|
| 1 | 510.535 | 7.400 | 1.80610 | 40.73 |
| 2 | 146.378 | 11.817 | | |
| 3 | 144.822 | 21.881 | 1.48749 | 70.45 |
| 4 | −662.310 | 0.300 | | |
| 5 | 174.683 | 12.232 | 1.48749 | 70.45 |
| 6 | 945.228 | 3.945~40.864~84.804 | | |
| 7 | 166.981 | 5.600 | 1.49700 | 81.61 |
| 8 | 47.717 | 14.693 | | |
| 9 | 576.327 | 3.300 | 1.49700 | 81.61 |
| 10 | 99.202 | 0.415 | | |
| 11 | 54.677 | 6.202 | 1.72916 | 54.66 |
| 12 | 72.218 | 62.928~34.785~7.508 | | |
| 13 | −71.881 | 2.400 | 1.75520 | 27.52 |
| 14 | 136.092 | 24.395~24.601~26.192 | | |
| 15 | 5181.799 | 6.299 | 1.74077 | 27.75 |
| 16 | −155.826 | 20.160~21.290~17.692 | | |
| 17 | 399.597 | 6.608 | 1.65844 | 50.84 |
| 18 | −120.899 | 26.768~16.657~2.000 | | |
| 19 (Aperture Stop) | ∞ | 1.325 | | |
| 20 | 109.301 | 3.961 | 1.75520 | 27.52 |
| 21 | 252.288 | 52.348 | | |
| 22 | 108.179 | 1.600 | 1.56732 | 42.85 |
| 23 | 61.326 | 10.142 | | |
| 24 | −53.446 | 3.000 | 1.80610 | 40.73 |
| 25 | 194.182 | 2.247 | | |
| 26 | 264.423 | 10.344 | 1.49700 | 81.61 |
| 27 | −59.832 | 0.300 | | |
| 28 | 85.440 | 12.431 | 1.49700 | 81.61 |
| 29 | −126.941 | 0.300 | | |
| 30 | −509.929 | 3.300 | 1.80610 | 40.73 |
| 31 | 76.169 | 3.090 | | |
| 32 | 95.849 | 14.373 | 1.49700 | 81.61 |
| 33 | −92.616 | 1.000 | | |
| 34 | 89.201 | 9.445 | 1.49700 | 81.61 |
| 35 | ∞ | 18.450 | | |
| 36 | ∞ | 116.500 | 1.51680 | 64.20 |
| 37 | ∞ | 5.000 | | |
| 38 | ∞ | 3.000 | 1.48749 | 70.45 |
| 39 | ∞ | 0.500 | | |
| 40 | ∞ | | | |

Miscellaneous Data

ZR = 1.64
Y' = 18.99
f = 49.889~61.932~81.638
FNo = 3.400~3.399~3.399

-continued

| unit: mm | |
|---|---|
| ω = | 20.838~17.003~13.095 |
| BF = | 109.072~109.08~109.075 |
| TL = | 466.177~466.184~466.179 |

Zoom Lens Group Data

| lens group | (surface) | focal length |
|---|---|---|
| 1 | (1-6) | 361.279 |
| 2 | (7-12) | -121.625 |
| 3 | (13-14) | -61.976 |
| 4 | (15-16) | 204.318 |
| 5 | (17-18) | 141.679 |
| 6 | (19-35) | 126.243 |

Example 3 unit: mm

Surface Data

| i | r | t | Nd | Vd |
|---|---|---|---|---|
| 1 | 190.089 | 15.080 | 1.51680 | 64.20 |
| 2 | -1431.688 | 0.300 | | |
| 3 | 364.361 | 7.000 | 1.49700 | 81.61 |
| 4 | 84.916 | 17.323 | | |
| 5 | 7065.621 | 4.000 | 1.49700 | 81.61 |
| 6 | 102.495 | 30.145 | | |
| 7 | -63.773 | 4.000 | 1.60342 | 38.00 |
| 8 | -2465.280 | 4.586 | | |
| 9 | -419.103 | 21.389 | 1.77250 | 49.65 |
| 10 | -79.834 | 78.890 | | |
| 11 | 73.002 | 6.215 | 1.67270 | 32.17 |
| 12 | 91.356 | 82.660~63.366~46.047 | | |
| 13 | -267.158 | 5.000 | 1.56883 | 56.04 |
| 14 | 58.887 | 2.127 | | |
| 15 | 61.435 | 15.291 | 1.49700 | 81.61 |
| 16 | -177.434 | 0.300 | | |
| 17 | 171.807 | 6.242 | 1.49700 | 81.61 |
| 18 | -1449.492 | 4.867~31.816~59.206 | | |
| 19 | -84.999 | 2.000 | 1.49700 | 81.61 |
| 20 | 254.677 | 18.491~11.709~3.000 | | |
| 21 | 64.190 | 4.141 | 1.67270 | 32.17 |
| 22 | 136.102 | 6.078~5.203~3.842 | | |
| 23 (Aperture Stop) | ∞ | 55.516 | | |
| 24 | -43.506 | 2.000 | 1.80610 | 40.73 |
| 25 | 1572.517 | 2.755 | | |
| 26 | -563.456 | 9.647 | 1.49700 | 81.61 |
| 27 | -53.028 | 0.300 | | |
| 28 | 227.199 | 10.782 | 1.49700 | 81.61 |
| 29 | -85.466 | 0.300 | | |
| 30 | 154.117 | 3.000 | 1.74330 | 49.23 |
| 31 | 96.417 | 4.160 | | |
| 32 | 164.074 | 8.668 | 1.49700 | 81.61 |
| 33 | -204.947 | 0.583 | | |
| 34 | 109.777 | 8.035 | 1.49700 | 81.61 |
| 35 | -2799.915 | 23.129 | | |
| 36 | ∞ | 116.500 | 1.51680 | 64.20 |
| 37 | ∞ | 5.000 | | |
| 38 | ∞ | 3.000 | 1.48749 | 70.45 |
| 39 | ∞ | 0.500 | | |
| 40 | ∞ | | | |

Miscellaneous Data

| ZR = | 1.27 |
|---|---|
| Y' = | 18.71 |
| f = | 46.883~52.398~59.383 |
| FNo = | 3.401~3.401~3.400 |
| ω = | 21.747~19.587~17.404 |

-continued

| unit: mm | |
|---|---|
| BF = | 107.478~107.469~107.472 |
| TL = | 549.349~549.339~549.342 |

Zoom Lens Group Data

| lens group | (surface) | focal length |
|---|---|---|
| 1 | (1-12) | -1764.545 |
| 2 | (13-18) | 340.458 |
| 3 | (19-20) | -127.977 |
| 4 | (21-22) | 176.507 |
| 5 | (23-35) | 97.788 |

Example 4 unit: mm

Surface Data

| i | r | t | Nd | Vd |
|---|---|---|---|---|
| 1 | 253.740 | 13.058 | 1.51680 | 64.20 |
| 2 | -909.688 | 0.300 | | |
| 3 | 782.738 | 7.000 | 1.49700 | 81.61 |
| 4 | 92.067 | 15.706 | | |
| 5 | 834.102 | 4.000 | 1.49700 | 81.61 |
| 6 | 125.184 | 29.774 | | |
| 7 | -69.594 | 5.000 | 1.60342 | 38.00 |
| 8 | 1088.314 | 4.617 | | |
| 9 | -1133.268 | 23.718 | 1.77250 | 49.65 |
| 10 | -87.531 | 60.198 | | |
| 11 | 68.027 | 6.422 | 1.67270 | 32.17 |
| 12 | 79.601 | 97.952~84.823~72.952 | | |
| 13 | -105.942 | 3.000 | 1.56883 | 56.04 |
| 14 | 63.750 | 2.131 | | |
| 15 | 67.186 | 15.612 | 1.49700 | 81.61 |
| 16 | -109.671 | 0.300 | | |
| 17 | 173.604 | 7.318 | 1.49700 | 81.61 |
| 18 | -298.846 | 4.376~25.939~47.811 | | |
| 19 | -82.905 | 2.000 | 1.49700 | 81.61 |
| 20 | 155.543 | 3.040~3.089~3.000 | | |
| 21 | 107.858 | 3.470 | 1.67270 | 32.17 |
| 22 | 155.700 | 22.573~13.773~3.000 | | |
| 23 | 71.507 | 4.013 | 1.67270 | 32.17 |
| 24 | 141.972 | 3.837~4.155~5.016 | | |
| 25 (Aperture Stop) | ∞ | 60.617 | | |
| 26 | -48.837 | 2.193 | 1.80610 | 40.73 |
| 27 | 411.927 | 2.614 | | |
| 28 | 2356.531 | 10.595 | 1.49700 | 81.61 |
| 29 | -55.499 | 0.300 | | |
| 30 | 185.845 | 11.340 | 1.49700 | 81.61 |
| 31 | -92.200 | 0.300 | | |
| 32 | 132.984 | 3.000 | 1.74330 | 49.23 |
| 33 | 88.416 | 4.124 | | |
| 34 | 136.765 | 8.615 | 1.49700 | 81.61 |
| 35 | -306.015 | 0.300 | | |
| 36 | 109.334 | 7.049 | 1.49700 | 81.61 |
| 37 | 600.954 | 24.536 | | |
| 38 | ∞ | 116.500 | 1.51680 | 64.20 |
| 39 | ∞ | 5.000 | | |
| 40 | ∞ | 3.000 | 1.48749 | 70.45 |
| 41 | ∞ | 0.500 | | |
| 42 | ∞ | | | |

Miscellaneous Data

| ZR = | 1.25 |
|---|---|
| Y' = | 18.68 |
| f = | 47.514~52.793~59.393 |
| FNo = | 3.401~3.401~3.400 |
| ω = | 21.459~19.446~17.401 |

-continued

| unit: mm | |
|---|---|
| BF = | 108.884~108.875~108.871 |
| TL = | 559.349~559.34~559.336 |

Zoom Lens Group Data

| lens group | (surface) | focal length |
|---|---|---|
| 1 | (1-12) | −1369.272 |
| 2 | (13-18) | 297.096 |
| 3 | (19-20) | −108.511 |
| 4 | (21-22) | 507.020 |
| 5 | (23-24) | 209.370 |
| 6 | (25-37) | 101.471 |

TABLE 1

| Conditional Formula | | Example 1 | Example 2 | Example 3 | Example 4 |
|---|---|---|---|---|---|
| (1) | W | 0.571 | 0.583 | 0.500 | 0.250 |
| | M | 0.733 | 0.643 | 0.667 | 0.556 |
| | T | 0.455 | 0.692 | 0.429 | 0.667 |
| (2) | | 0.566 | 0.463 | 0.492 | 0.504 |
| (3) | | 0.249 | 0.236 | 0.069 | 0.086 |
| (4) | | 5th Lens Group | 4th Lens Group | 3th Lens Group | 3th Lens Group |
| | | 0.551 | 0.337 | 0.484 | 0.737 |
| (5) | | L7 | L7 | L10 | L10 |
| | | 0.010 | 0.010 | 0.037 | 0.037 |
| | | | | L9 | |
| | | | | 0.006 | |

$\theta g, F = ag, F + bg, F \times Vd + \Delta\theta g, F$
$ag, F$ and $bg, F$ are constants.
$ag, F = 0.648327$
$bg, F = -0.0018024$
$\theta g, F = (ng - nF)/(nF - nC)$

What is claimed is:

1. A projection lens system constructed as a zoom lens system which is for use with a laser light source and performs magnification variation by moving at least a lens group along an optical axis, the projection lens system fulfilling conditional formula (1) below:

$$(|AC(B2-G)|+|AC(R2-G)|)/(|AC(B1-G)|+|AC(R1-G)|)<0.8 \quad (1)$$

where

AC(B2−G) represents longitudinal chromatic aberration between blue and green laser wavelengths;

AC(R2−G) represents longitudinal chromatic aberration between red and green laser wavelengths;

AC(B1−G) represents longitudinal chromatic aberration between (i) a middle value of a green laser wavelength and a blue laser wavelength, and (ii) the green laser wavelength; and AC(R1−G) represents longitudinal chromatic aberration between (i) a middle value of a green laser wavelength and a red laser wavelength, and (ii) the green laser wavelength.

2. The projection lens system according to claim 1, comprising, in the following order from an enlargement side:
a first lens group;
a second lens group which is movable; and
at least two movable lens groups disposed closer to a reduction side than the second lens group, wherein,
let a lens group located next to the second lens group on a reduction side of the second lens group be a third lens group,
lens elements in the movable lens groups from the third lens group onward all fulfill conditional formula (2) below:

$$0.4<\{fw^2\times\Sigma(hw\times hw\times\Delta\theta g,F\times pi/Vd)\}/\{ft^2\times\Sigma(ht\times ht\times\Delta\theta g,F\times pi/Vd)\}<2.5 \quad (2)$$

where $\Delta\theta g, F$ represents an anomalous dispersion characteristic of each lens glass material;

pi represents a refractive power of each lens element;

fw represents a focal length at a wide-angle end;

ft represents a focal length at a telephoto end;

hw represents a light ray passing height of on-axis marginal light at the wide-angle end;

ht represents a light ray passing height of on-axis marginal light at the telephoto end; and Vd represents dispersion (an Abbe number) of each lens glass material.

3. The projection lens system according to claim 2, wherein
the at least two movable lens groups are each composed of two or less lens elements.

4. The projection lens system according to claim 2, wherein
the projection lens system fulfills conditional formula (3) below:

$$T3s/TLw<0.3 \quad (3)$$

where $T3s$ represents a maximum distance, along the optical axis, from a lens surface in the movable lens groups from the third lens group onward to an aperture stop; and TLw represents a total lens length at the wide-angle end.

5. The projection lens system according to claim 2, wherein
the projection lens system fulfills conditional formula (4) below:

$$0.2<|Tmax/T2|<0.8 \quad (4)$$

where

Tmax represents a maximum moving amount of the movable lens groups from the third lens group onward in magnification variation; and T2 represents a moving amount of the second lens group in magnification variation.

6. The projection lens system according to claim 2, wherein
the movable lens groups from the third lens group onward include at least a lens group having a negative optical power and at least a lens group having a positive optical power.

7. The projection lens system according to claim 2, wherein
the third lens group has a negative optical power.

8. The projection lens system according to claim 2, wherein,
let a lens group located on a reduction side of, next to, the third lens group be a fourth lens group,
the fourth lens group has a positive optical power.

9. The projection lens system according to claim 2, wherein
each lens element having a negative optical power and included in the movable lens groups from the third lens group onward fulfills conditional formula (5) below:

$$\Delta\theta g, F > 0 \quad (5)$$

where
$\Delta\theta g, F$ represents the anomalous dispersion characteristic of each lens glass material.

10. The projection lens system according to claim 2, wherein
the first lens group is stationary in magnification variation.

11. The projection lens system according to claim 2, wherein
a lens group located closest to the reduction side is stationary in magnification variation.

12. The projection lens system according to claim 2, wherein
a lens group located closest to the reduction side has a positive optical power.

13. The projection lens system according to claim 2, wherein
movable lens groups located closer to the reduction side than the third lens group are each composed of a single lens.

14. The projection lens system according to claim 2, wherein
movable lens groups located closer to the reduction side than the third lens group are all located closer to the enlargement side than an aperture stop.

15. A projector, comprising:
an image display device that displays an image;
a laser light source;
an illumination optical system that directs light from the laser light source to the image display device; and
a projection lens system that projects, while enlarging, the image displayed on the image display device onto a screen surface,
wherein
the projection lens system is constructed as a zoom lens system which is for use with a laser light source and performs magnification variation by moving at least a lens group along an optical axis, and the projection lens system fulfills conditional formula (1) below:

$$(|AC(B2-G)|+|AC(R2-G)|)/(|AC(B1-G)|+|AC(R1-G)|) < 0.8 \quad (1)$$

where
AC(B2−G) represents longitudinal chromatic aberration between blue and green laser wavelengths;
AC(R2−G) represents longitudinal chromatic aberration between red and green laser wavelengths;
AC(B1−G) represents longitudinal chromatic aberration between (i) a middle value of a green laser wavelength and a blue laser wavelength, and (ii) the green laser wavelength; and
AC(R1−G) represents longitudinal chromatic aberration between (i) a middle value of a green laser wavelength and a red laser wavelength, and (ii) the green laser wavelength.

16. The projector according to claim 15, wherein
the projection lens system includes, in the following order from an enlargement side:
a first lens group;
a second lens group which is movable; and
at least two movable lens groups disposed closer to a reduction side than the second lens group; and
let a lens group located next to the second lens group on a reduction side of the second lens group be a third lens group,
lens elements in the movable lens groups from the third lens group onward all fulfill conditional formula (2) below:

$$0.4 < \{fw^2 \times \Sigma(hw \times hw \times \Delta\theta g, F \times pi/Vd)\}/\{ft^2 \times \Sigma(ht \times ht \times \Delta\theta g, F \times pi/Vd)\} < 2.5 \quad (2)$$

where
$\Delta\theta g, F$ represents an anomalous dispersion characteristic of each lens glass material;
pi represents a refractive power of each lens element;
fw represents a focal length at a wide-angle end;
ft represents a focal length at a telephoto end;
hw represents a light ray passing height of on-axis marginal light at the wide-angle end;
ht represents a light ray passing height of on-axis marginal light at the telephoto end; and
Vd represents dispersion (an Abbe number) of each lens glass material.

17. The projector according to claim 16, wherein
the at least two movable lens groups of the projection lens system are each composed of two or less lens elements.

18. The projector according to claim 16, wherein
the projection lens system fulfills conditional formula (3) below:

$$T3s/TLw < 0.3 \quad (3)$$

where
T3s represents a maximum distance, along the optical axis, from a lens surface in the movable lens groups from the third lens group onward to an aperture stop; and
TLw represents a total lens length at the wide-angle end.

19. The projector according to claim 16, wherein
the projection lens system fulfills conditional formula (4) below:

$$0.2 < |T\text{max}/T2| < 0.8 \quad (4)$$

where
Tmax represents a maximum moving amount of the movable lens groups from the third lens group onward in magnification variation; and
T2 represents a moving amount of the second lens group in magnification variation.

20. The projector according to claim 16, wherein,
the movable lens groups from the third lens group onward of the projection lens system include at least a lens group having a negative optical power and at least a lens group having a positive optical power.

* * * * *